United States Patent
Takami et al.

(10) Patent No.: US 12,530,003 B2
(45) Date of Patent: Jan. 20, 2026

(54) CONTROLLING EQUIPMENT BASED ON REINFORCED LEARNING USING AN OPERATION MODEL

(71) Applicant: Yokogawa Electric Corporation, Tokyo (JP)

(72) Inventors: Go Takami, Tokyo (JP); Hiroaki Kanokogi, Tokyo (JP); Keiichiro Kobuchi, Tokyo (JP); Yota Furukawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 461 days.

(21) Appl. No.: 17/970,544

(22) Filed: Oct. 20, 2022

(65) Prior Publication Data

US 2023/0126567 A1 Apr. 27, 2023

(30) Foreign Application Priority Data

Oct. 27, 2021 (JP) .................................. 2021-175652
Nov. 26, 2021 (JP) .................................. 2021-191945
Nov. 26, 2021 (JP) .................................. 2021-191964

(51) Int. Cl.
*G05B 13/04* (2006.01)
*G05B 13/02* (2006.01)

(52) U.S. Cl.
CPC ....... *G05B 13/041* (2013.01); *G05B 13/0265* (2013.01); *G05B 13/042* (2013.01); *G05B 13/048* (2013.01)

(58) Field of Classification Search
CPC . G05B 13/041; G05B 13/0265; G05B 13/048
(Continued)

(56) References Cited

U.S. PATENT DOCUMENTS

| 10,766,136 B1 | 9/2020 | Porter |
| 2007/0168057 A1 | 7/2007 | Blevins |

(Continued)

FOREIGN PATENT DOCUMENTS

| EP | 2924570 A2 | 9/2015 |
| EP | 3828251 A1 | 6/2021 |

(Continued)

OTHER PUBLICATIONS

Office Action issued for counterpart Japanese Application No. 2021-175652, transmitted from the Japanese Patent Office on Oct. 24, 2023 (drafted on Oct. 13, 2023).

(Continued)

*Primary Examiner* — Jigneshkumar C Patel

(57) ABSTRACT

Provided is an operation system including: an evaluation model generation apparatus configured to generate, by machine learning, an evaluation model configured to output an indicator indicating a result of evaluating a state in a piece of equipment with respect to an intended target based on an operation target in the piece of equipment and a state in the piece of equipment; an operation model generation apparatus configured to generate an operation model configured to output an action corresponding to the state in the piece of equipment, by reinforcement learning in which an output of the evaluation model is set as at least a part of a reward; and a control apparatus configured to apply, to a controlled object in the piece of equipment, a manipulated variable based on the action that is output by the operation model according to the state in the piece of equipment.

20 Claims, 22 Drawing Sheets

(58) Field of Classification Search
USPC .......................................................... 700/29
See application file for complete search history.

(56) References Cited

U.S. PATENT DOCUMENTS

| | | | |
|---|---|---|---|
| 2010/0070098 A1 | 3/2010 | Sterzing | |
| 2015/0277399 A1 | 10/2015 | Maturana | |
| 2017/0003676 A1 | 1/2017 | Yoshida | |
| 2017/0031343 A1* | 2/2017 | Hatanaka | G05B 19/19 |
| 2017/0151618 A1* | 6/2017 | Shirai | G06N 20/00 |
| 2018/0181108 A1* | 6/2018 | Nagano | G05B 19/182 |
| 2019/0018374 A1 | 1/2019 | Kaneki | |
| 2019/0258982 A1 | 8/2019 | Suzuki | |
| 2020/0057416 A1 | 2/2020 | Matsubara | |
| 2020/0070844 A1 | 3/2020 | Goto | |
| 2020/0293021 A1 | 9/2020 | Goya | |
| 2021/0157280 A1 | 5/2021 | Takami | |
| 2021/0264269 A1 | 8/2021 | Sato | |
| 2021/0397142 A1 | 12/2021 | Lovell | |
| 2022/0334553 A1 | 10/2022 | Shinozaki | |

FOREIGN PATENT DOCUMENTS

| | | |
|---|---|---|
| JP | 2017224027 A | 12/2017 |
| JP | 2018092511 A | 6/2018 |
| JP | 2019020885 A | 2/2019 |
| JP | 2019141869 A | 8/2019 |
| JP | 2020027556 A | 2/2020 |
| JP | 2021064049 A | 4/2021 |
| JP | 2021086283 A | 6/2021 |
| JP | 2021107962 A | 7/2021 |
| JP | 2021143882 A | 9/2021 |
| WO | 2019126755 A1 | 6/2019 |
| WO | 2021044899 A1 | 3/2021 |

OTHER PUBLICATIONS

Extended European Search Report for counterpart European Application No. 22204147.7, issued by the European Patent Office on Feb. 28, 2023.
Go Takami, "AI-based Plant Control", Yokogawa Kibo, Yokogawa Electric Co., Ltd., 2020, vol. 63, No. 1, p. 33-36.
Takuji Imai, "Yokogawa Electric and NAIST realize advanced dml control with reinforcement learning for chemical plants and small number of trials", Nikkei Robotics , Nikkei BP, Inc., Mar. 2019, p. 22-25.
Extended European Search Report for related European Application No. 22204153.5, issued by the European Patent Office on Feb. 28, 2023.
Robert G. Sargent, Verification and validation of simulation models, Journal of simulation:JOS, Feb. 1, 2013, pp. 183-198, London.
Office Action issued for related Japanese Application No. 2021-191945, transmitted from the Japanese Patent Office on Oct. 24, 2023 (drafted on Oct. 13, 2023).
Extended European Search Report for related European Application No. 22204158.4, issued by the European Patent Office on Mar. 1, 2023.
Office Action issued for related U.S. Appl. No. 17/970,561, issued by the US Patent and Trademark Office on May 30, 2025.
Office Action issued for related U.S. Appl. No. 17/970,556, issued by the US Patent and Trademark Office on Apr. 10, 2025.
Spielberg et al., "Deep Reinforcement Learning for Process Control: A Primer for Beginners," AIChE Journal, vol. 65, 1 dated No. 10, published 2019.

* cited by examiner

| OPERATION TARGET | | OBJECT | | | TAG INFORMATION 1 | | | | TAG INFORMATION 2 | | | | | GRAPH IMAGE | TRAINING LABEL |
|---|---|---|---|---|---|---|---|---|---|---|---|---|---|---|---|
| TARGET ITEM | TARGET VALUE | CATE-GORY | CONTROL LOOP | NAME | PHYSICAL QUANTITY | MINI-MUM VALUE | MAXI-MUM VALUE | UNIT | NAME | PHYSICAL QUANTITY | MINIMUM VALUE | MAXIMUM VALUE | UNIT | | |
| QUALITY IMPROVE-MENT | 20ppm | DISTIL-LATION TOWER | LOOP 1 | QI341 | CONCENT-RATION | 5 | 45 | ppm | DateTime | TIME | 2019/08/01 | 2019/08/31 | day | xxx1.jpg | OK |
| QUALITY IMPROVE-MENT | 20ppm | DISTIL-LATION TOWER | LOOP 1 | QI341 | CONCENT-RATION | 5 | 45 | ppm | DateTime | TIME | 2019/09/01 | 2019/11/30 | day | xxx2.jpg | NG |
| FAILURE PROGNO-SIS | 1 YEAR | ROTATING MACHINE | LOOP 2 | AI104 | ACCEL-ERATION | 10 | 20 | m/s2 | DateTime | TIME | 2019/04/01 00:00 | 2019/04/01 24:00 | sec | xxx3.jpg | OK |
| FAILURE PROGNO-SIS | 1 YEAR | ROTATING MACHINE | LOOP 2 | AI104 | ACCEL-ERATION | 10 | 20 | m/s2 | DateTime | TIME | 2019/04/02 00:00 | 2019/04/02 24:00 | sec | xxx4.jpg | NG |
| ENERGY SAVING | -5% | REACTING FURNACE | LOOP 5 | EI101 | TEMPERA-TURE | 40 | 60 | °C | QI542 | CONCENT-RATION | 10 | 50 | ppm | xxx5.jpg | OK |
| ENERGY SAVING | -5% | REACTING FURNACE | LOOP 5 | EI103 | TEMPERA-TURE | 40 | 60 | °C | QI544 | CONCENT-RATION | 10 | 50 | ppm | xxx6.jpg | NG |

FIG.3

| OPERATION TARGET | | OBJECT | | TAG INFORMATION 1 | | | | | TAG INFORMATION 2 | | | | GRAPH IMAGE |
|---|---|---|---|---|---|---|---|---|---|---|---|---|---|
| TARGET ITEM | TARGET VALUE | CATEGORY | CONTROL LOOP | NAME | PHYSICAL QUANTITY | MINIMUM VALUE | MAXIMUM VALUE | UNIT | NAME | PHYSICAL QUANTITY | MINIMUM VALUE | MAXIMUM VALUE | UNIT | |
| QUALITY IMPROVEMENT | 20ppm | DISTILLATION TOWER | LOOP 1 | QI352 | CONCENTRATION | 5 | 45 | ppm | DateTime | TIME | 2020/06/01 | 2020/08/31 | day | yyy1.jpg |
| QUALITY IMPROVEMENT | 20ppm | DISTILLATION TOWER | LOOP 1 | QI352 | CONCENTRATION | 5 | 45 | ppm | DateTime | TIME | 2020/09/01 | 2020/11/30 | day | yyy2.jpg |
| QUALITY IMPROVEMENT | 15ppm | DISTILLATION TOWER | LOOP 1 | QI343 | CONCENTRATION | 10 | 20 | ppm | DateTime | TIME | 2020/06/01 | 2020/08/31 | day | yyy3.jpg |
| QUALITY IMPROVEMENT | 15ppm | DISTILLATION TOWER | LOOP 1 | QI343 | CONCENTRATION | 10 | 20 | ppm | DateTime | TIME | 2020/09/01 | 2020/11/30 | day | yyy4.jpg |
| QUALITY IMPROVEMENT | 50% | DISTILLATION TOWER | LOOP 1 | PI342 | PRESSURE | 0 | 100 | % | DateTime | TIME | 2020/06/01 | 2020/08/31 | day | yyy5.jpg |
| QUALITY IMPROVEMENT | 50% | DISTILLATION TOWER | LOOP 1 | PI342 | PRESSURE | 0 | 100 | % | DateTime | TIME | 2020/09/01 | 2020/11/30 | day | yyy6.jpg |
| QUALITY IMPROVEMENT | 50°C | DISTILLATION TOWER | LOOP 1 | TC353 | TEMPERATURE | 0 | 100 | °C | DateTime | TIME | 2020/06/01 | 2020/08/31 | day | yyy7.jpg |
| QUALITY IMPROVEMENT | 50°C | DISTILLATION TOWER | LOOP 1 | TC353 | TEMPERATURE | 0 | 100 | °C | DateTime | TIME | 2020/09/01 | 2020/11/30 | day | yyy8.jpg |

*FIG.6*

| DEVICE ID | DEVICE TAG | DEVICE TYPE | INSTALLA- TION PLACE | CONTROL LOOP NAME | I/O TYPE | LOWER LIMIT VALUE | UPPER LIMIT VALUE | UNIT | DEGREE OF IMPORTANCE OF DEVICE | COMMUNICA- TION TYPE |
|---|---|---|---|---|---|---|---|---|---|---|
| P1234 | PI351 | BAROMETER | SITE A | LOOP 1 | FOR MONITOR | 0 | 100 | Pa | MEDIUM | HART |
| P1235 | PI352 | BAROMETER | SITE A | LOOP 1 | FOR MONITOR | 0 | 100 | Pa | MEDIUM | HART |
| P1236 | PI353 | BAROMETER | SITE A | LOOP 1 | FOR MONITOR | 0 | 100 | Pa | MEDIUM | HART |
| P1237 | FI354 | FLOWMETER | SITE A | LOOP 1 | FOR MONITOR | 0 | 30 | m/s | MEDIUM | HART |
| P1238 | FI355 | FLOWMETER | SITE A | LOOP 1 | FOR MANI- PULATION | 0 | 30 | m/s | HIGH | HART |
| P1239 | V356 | VALVE | SITE A | LOOP 1 | FOR MANI- PULATION | 0 | 100 | % | HIGH | HART |
| P1240 | V357 | VALVE | SITE A | LOOP 1 | FOR MANI- PULATION | 0 | 100 | % | HIGH | HART |
| P1241 | TI358 | THERMO- METER | SITE A | LOOP 1 | FOR MANI- PULATION | -10 | 50 | °C | HIGH | HART |
| P1242 | TI359 | THERMO- METER | SITE A | LOOP 2 | FOR MONITOR | -10 | 50 | °C | HIGH | HART |

FIG.7

| LI001 | LI002 | LI003 | FI001 | FI002 | V001 | LABEL |
|---|---|---|---|---|---|---|
| 0.450879 | 0.008805 | 8.72E-05 | 9.327755 | 0 | 50 | OK |
| 0.918017 | 0.039704 | 0.001035 | 9.902192 | 0 | 50 | OK |
| 1.384217 | 0.091997 | 0.003854 | 10.28881 | 0 | 50 | OK |
| 1.848913 | 0.16452 | 0.009446 | 10.76794 | 0 | 50 | OK |
| 2.323386 | 0.256398 | 0.018802 | 11.54525 | 0 | 50 | OK |
| 2.826716 | 0.367507 | 0.032031 | 12.76132 | 0 | 50 | OK |
| 3.382398 | 0.49878 | 0.050416 | 14.50084 | 0 | 50 | OK |
| 4.016568 | 0.652289 | 0.07446 | 16.8011 | 0 | 50 | OK |
| 4.750783 | 0.831233 | 0.104947 | 19.66004 | 0 | 50 | OK |
| 5.610289 | 1.039819 | 0.142787 | 23.04371 | 0 | 50 | OK |
| 6.612748 | 1.283073 | 0.188957 | 26.89323 | 0 | 47 | OK |
| 7.773245 | 1.5666 | 0.245018 | 31.13111 | 0 | 47 | OK |

| LI001 | LI002 | LI003 | FI001 | FI002 | V001 | LABEL |
|---|---|---|---|---|---|---|
| 55.34473 | 51.26829 | 35.55974 | 52.94244 | 0 | 58 | NG |
| 55.3303 | 54.46779 | 35.80929 | 53.88641 | 0 | 58 | NG |
| 55.30705 | 51.85663 | 36.05253 | 52.94244 | 0 | 58 | NG |
| 55.29446 | 51.83528 | 36.28937 | 53.88641 | 0 | 58 | NG |
| 55.27297 | 52.00439 | 36.51972 | 52.94244 | 0 | 58 | NG |
| 55.26206 | 52.16436 | 36.74354 | 53.88641 | 0 | 58 | NG |
| 55.29908 | 52.31892 | 36.96082 | 54.82389 | 0 | 59 | NG |
| 55.32463 | 52.46359 | 37.17100 | 53.88641 | 0 | 59 | NG |
| 55.35877 | 52.60449 | 37.37617 | 54.82389 | 0 | 59 | NG |
| 55.38159 | 52.73994 | 37.57448 | 53.88641 | 0 | 59 | NG |
| 55.50668 | 52.87135 | 37.76874 | 56.67877 | 0 | 62 | NG |
| 55.67189 | 53.00382 | 37.95324 | 57.59092 | 0 | 62 | NG |

FIG.9

| TI001 | TI002 | TI003 | FI001 | FI002 | V001 | ACTION | WEIGHT |
|---|---|---|---|---|---|---|---|
| -2.47803 | -2.48413 | -0.07324 | 29.71191 | 24.2511 | 70 | 1 | 144.1484 |
| -2.48413 | -2.47803 | 2.972412 | 31.04248 | 27.4251 | 71 | -1 | -218.316 |
| -2.48413 | -2.48413 | 5.583271 | 31.88477 | 27.89047 | 70 | -1 | 117.1561 |
| -2.49023 | -2.48413 | 11.13281 | 32.71484 | 26.479 | 70 | 1 | -252.506 |
| -2.49634 | -2.48413 | 15.80811 | 33.48999 | 32.89337 | 74 | -3 | 82.16214 |
| -2.49023 | -2.48413 | 24.21265 | 33.97827 | 30.67796 | 68 | -3 | 154.4256 |
| -2.48413 | -2.48413 | 27.69775 | 32.06177 | 26.53965 | 64 | -3 | 156.0428 |
| -2.49023 | -0.37842 | 28.45459 | 30.33447 | 29.70328 | 66 | -3 | 75.27125 |
| -2.49023 | 4.937744 | 29.23584 | 29.93164 | 27.62347 | 64 | -1 | -491.443 |
| -1.5625 | 9.039307 | 28.79028 | 27.83203 | 19.13351 | 53 | -3 | -203.099 |
| -0.53711 | 10.47363 | 27.36206 | 25.67139 | 21.08102 | 51 | 3 | 198.1082 |
| 1.062012 | 12.18872 | 25.64087 | 25.36011 | 21.30703 | 57 | 0 | 278.2919 |
| 5.255127 | 15.14282 | 22.67456 | 26.09863 | 22.49868 | 57 | 1 | 76.35704 |
| 9.875488 | 17.77954 | 23.05908 | 28.6438 | 22.48553 | 64 | -3 | 262.9233 |

FIG.16

| TI001 | TI002 | TI003 | FI001 | FI002 | V001 | ACTION |
|---|---|---|---|---|---|---|
| 0.1 | 0.2 | 0.4 | 0.3 | 0.8 | 0.2 | -3 |
| 0.1 | 0.2 | 0.4 | 0.3 | 0.8 | 0.2 | -1 |
| 0.1 | 0.2 | 0.4 | 0.3 | 0.8 | 0.2 | 0 |
| 0.1 | 0.2 | 0.4 | 0.3 | 0.8 | 0.2 | 1 |
| 0.1 | 0.2 | 0.4 | 0.3 | 0.8 | 0.2 | 3 |

FIG.17

CONTROLLING EQUIPMENT BASED ON REINFORCED LEARNING USING AN OPERATION MODEL

The contents of the following Japanese patent application (s) are incorporated herein by reference:
NO. 2021-175652 filed in JP on Oct. 27, 2021
NO. 2021-191945 filed in JP on Nov. 26, 2021
NO. 2021-191964 filed in JP on Nov. 26, 2021

BACKGROUND

1. Technical Field

The present invention relates to an operation system, an operation method and a recording medium having recorded thereon an operation program.

2. Related Art

Patent Document 1 discloses "performing learning processing of a first model configured to output a recommended control parameter representing a first type of control content recommended so as to increase a reward value that is determined by a preset reward function, in response to an input of measurement data".

PRIOR ART DOCUMENT

[Patent Document]
[Patent document 1] Japanese Unexamined Patent Application, Publication No. 2021-086283
[Patent document 2] Japanese Unexamined Patent Application, Publication No. 2020-027556
[Patent document 3] Japanese Unexamined Patent Application, Publication No. 2019-020885

SUMMARY

A first aspect of the present invention provides an operation system. The operation system may include an evaluation model generation apparatus configured to generate, by machine learning, an evaluation model configured to output an indicator indicating a result of evaluating a state in a piece of equipment with respect to an intended target based on an operation target in the piece of equipment and a state in the piece of equipment. The operation system may include an operation model generation apparatus configured to generate an operation model configured to output an action corresponding to the state in the piece of equipment, by reinforcement learning in which an output of the evaluation model is set as at least a part of a reward. The operation system may include a control apparatus configured to apply, to a controlled object in the piece of equipment, a manipulated variable based on the action that is output by the operation model according to the state in the piece of equipment.

The evaluation model generation apparatus may be configured to update the evaluation model, based on the state in the piece of equipment when the controlled object is controlled using the operation model.

The operation model generation apparatus may be configured to update the operation model by reinforcement learning in which an output of the updated evaluation model is set as at least a part of the reward.

The control apparatus may be configured to control the controlled object by using the updated operation model.

The evaluation model generation apparatus may include an operation target acquisition unit configured to acquire the operation target. The evaluation model generation apparatus may include a state data acquisition unit configured to acquire state data representing the state in the piece of equipment. The evaluation model generation apparatus may include a correlation data generation unit configured to generate, based on the operation target, correlation data representing at least any of a correlation between at least one physical quantity included in the state data and a time or a correlation between at least two physical quantities included in the state data. The evaluation model generation apparatus may include a labeling unit configured to label the correlation data by using a labeling model. The evaluation model generation apparatus may include an evaluation model generation unit configured to generate the evaluation model by using the labeled correlation data.

The evaluation model generation apparatus may further include an evaluation model determination unit configured to determine validity of the evaluation model.

The evaluation model generation apparatus may further include an evaluation model output unit configured to output the evaluation model when the evaluation model is determined valid.

The evaluation model generation apparatus may further include a labeling model update unit configured to update the labeling model when the evaluation model is determined valid.

The evaluation model generation apparatus may further include a training label acquisition unit configured to acquire a training label for at least a part of the correlation data. The labeling model update unit may be configured to generate a labeling model for update, separately from an initial labeling model generated based on the training label.

A second aspect of the present invention provides an operation method. The operation method may include generating, by machine learning, an evaluation model configured to output an indicator indicating a result of evaluating a state in a piece of equipment with respect to an intended target based on an operation target in the piece of equipment and a state in the piece of equipment. The operation method may include generating an operation model configured to output an action corresponding to the state in the piece of equipment, by reinforcement learning in which an output of the evaluation model is set as at least a part of a reward. The operation method include applying, to a controlled object in the piece of equipment, a manipulated variable based on the action that is output by the operation model according to the state in the piece of equipment.

A third aspect of the present invention provides a recording medium having recorded thereon an operation program. The operation program may be configured to be executed by a computer. The operation program may be configured to cause the computer to function as an evaluation model generation apparatus configured to generate, by machine learning, an evaluation model configured to output an indicator indicating a result of evaluating a state in a piece of equipment with respect to an intended target based on an operation target in the piece of equipment and a state in the piece of equipment. The operation program may be configured to cause the computer to function as an operation model generation apparatus configured to generate an operation model configured to output an action corresponding to the state in the piece of equipment, by reinforcement learning in which an output of the evaluation model is set as at least a part of a reward. The operation program may be configured to cause the computer to function as a control apparatus configured to apply, to a controlled object in the piece of equipment, a manipulated variable based on the action that is output by the operation model according to the state in the piece of equipment.

A fourth aspect of the present invention provides an evaluation model generation apparatus. The evaluation model generation apparatus may include an operation target acquisition unit configured to acquire an operation target in a piece of equipment. The evaluation model generation apparatus may include a state data acquisition unit configured to acquire state data representing the state in the piece of equipment. The evaluation model generation apparatus may include a correlation data generation unit configured to generate, based on the operation target, correlation data representing at least any of a correlation between at least one physical quantity included in the state data and a time or a correlation between at least two physical quantities included in the state data. The evaluation model generation apparatus may include a labeling unit configured to label the correlation data by using a labeling model. The evaluation model generation apparatus may include an evaluation model generation unit configured to generate, by using the labeled correlation data, an evaluation model configured to output an indicator indicating a result of evaluating a state in the piece of equipment with respect to an intended target based on an operation target in the piece of equipment and a state in the piece of equipment.

A fifth aspect of the present invention provides an evaluation model generation method. The evaluation model generation method may include acquiring an operation target in a piece of equipment. The evaluation model generation method may include acquiring state data representing a state in the piece of equipment. The evaluation model generation method may include generating, based on the operation target, correlation data representing at least any of a correlation between at least one physical quantity included in the state data and a time or a correlation between at least two physical quantities included in the state data. The evaluation model generation method may include labeling the correlation data by using a labeling model. The evaluation model generation method may include generating, by using the labeled correlation data, an evaluation model configured to output an indicator indicating a result of evaluating a state in the piece of equipment with respect to an intended target based on an operation target in the piece of equipment and a state in the piece of equipment.

A sixth aspect of the present invention provides a recording medium having recorded thereon an evaluation model generation program. The evaluation model generation program may be configured to be executed by a computer. The evaluation model generation program may be configured to cause the computer to function as an operation target acquisition unit configured to acquire an operation target in a piece of equipment. The evaluation model generation program may be configured to cause the computer to function as a state data acquisition unit configured to acquire state data representing the state in the piece of equipment. The evaluation model generation program may be configured to cause the computer to function as a correlation data generation unit configured to generate, based on the operation target, correlation data representing at least any of a correlation between at least one physical quantity included in the state data and a time or a correlation between at least two physical quantities included in the state data. The evaluation model generation program may be configured to cause the computer to function as a labeling unit configured to label the correlation data by using a labeling model. The evalu-ation model generation program may be configured to cause the computer to function as an evaluation model generation unit configured to generate, by using the labeled correlation data, an evaluation model configured to output an indicator indicating a result of evaluating a state in the piece of equipment with respect to an intended target based on an operation target in the piece of equipment and a state in the piece of equipment.

The summary clause does not necessarily describe all necessary features of the embodiments of the present invention. The present invention may also be a sub-combination of the features described above.

BRIEF DESCRIPTION OF THE DRAWINGS

FIG. 3 shows an example of training data that is input to a learning machine when a labeling unit 220 generates an initial labeling model.

FIG. 6 shows an example of unlabeled correlation data that is a labeling object by the labeling unit 220.

FIG. 7 shows an example of an I/O list in the piece of equipment 10.

FIG. 9 shows an example of labeling data that is output by a labeling data output unit 222.

FIG. 16 shows an example of an operation model that is generated by the operation model generation apparatus 300.

FIG. 17 shows an example of an action decision table.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

Figure 1:
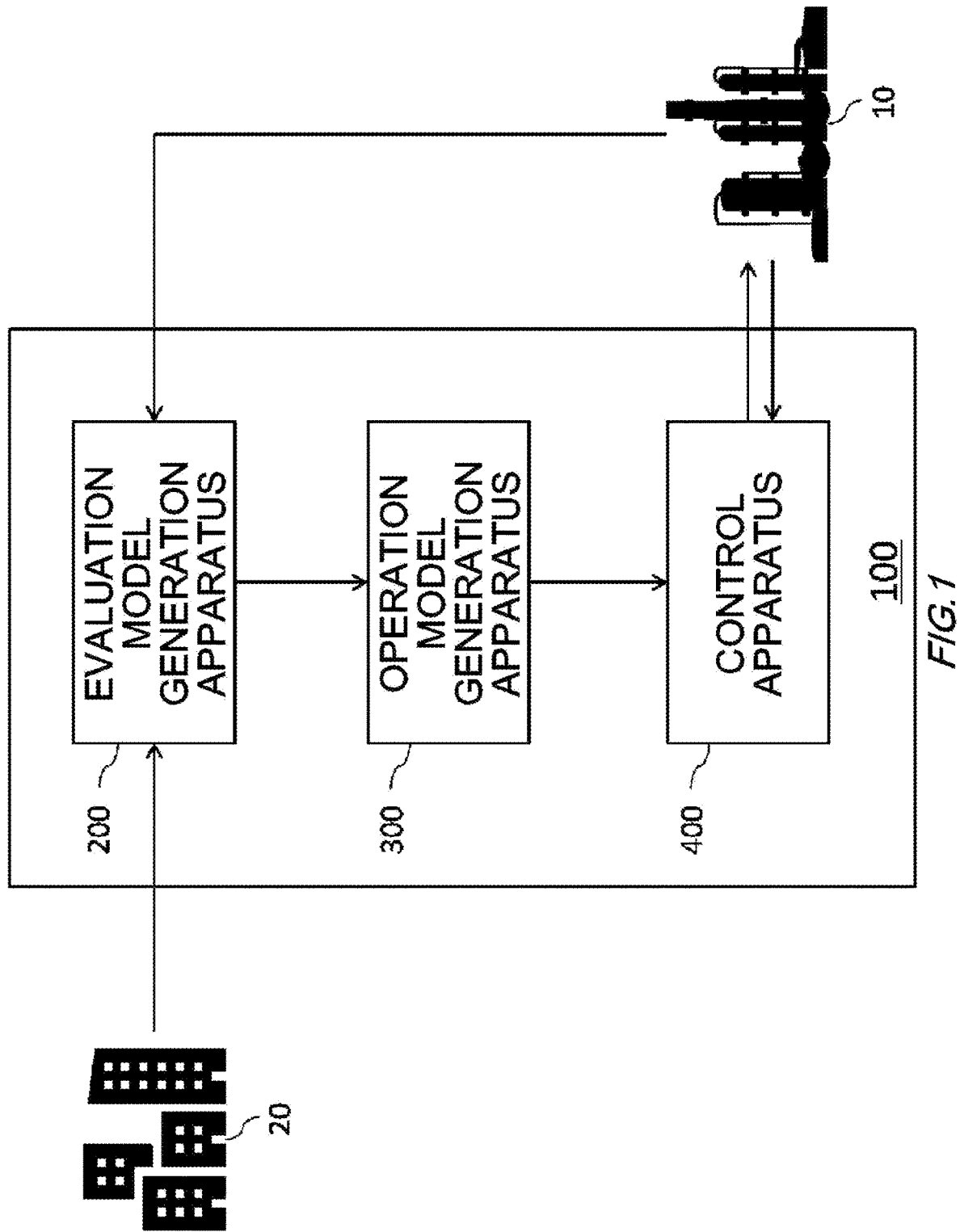
FIG. 1 shows an example of a block diagram of an operation system 100 according to the present embodiment, together with a piece of equipment 10 and a headquarters 20.

FIG. 1 shows an example of a block diagram of an operation system 100 according to the present embodiment, together with a piece of equipment 10 and a headquarters 20. Note that, these blocks are functional blocks that are each functionally divided, and may not be necessarily required to be matched with actual apparatus configurations. That is, in the present drawing, an apparatus indicated by one block may not be necessarily required to be configured by one apparatus. In addition, in the present drawing, apparatuses indicated by separate blocks may not be necessarily required to be configured by separate apparatuses. The same applies to subsequent block diagrams.

The piece of equipment 10 is a facility, an apparatus, or the like provided with a controlled object such as an actuator. For example, the piece of equipment 10 may be a plant or a complex apparatus in which a plurality of devices is combined. Examples of the plant may include a plant for managing and controlling wells such as a gas field and an oilfield and surroundings thereof, a plant for managing and controlling hydroelectric, thermo electric and nuclear power generations and the like, a plant for managing and controlling environmental power generation such as solar power and wind power, a plant for managing and controlling water and sewerage, a dam and the like, and the like, in addition to chemical and bio industrial plants and the like.

The headquarters 20 is an organization that is the center of the business that manages the piece of equipment 10, and may be, for example, a head office of a business operator, or the like. For example, in such headquarters 20, a management team responsible for management of the business operator may be enrolled. The management team designates an operation target to the operation system 100. Here, the operation target is a target set when operating the piece of equipment 10, and may include, for example, targeted items and values.

In the operation system 100 according to the present embodiment, an evaluation model configured to output an indicator indicating a result of evaluating a state in the piece of equipment 10 is generated by machine learning, and an operation model is generated by reinforcement learning in which an output of the evaluation model is set as at least a part of a reward. In the operation system 100 according to the present embodiment, a controlled object in the piece of equipment 10 is controlled using the operation model generated in this way.

The operation system 100 includes an evaluation model generation apparatus 200, an operation model generation apparatus 300, and a control apparatus 400.

The evaluation model generation apparatus 200 is configured to generate, by machine learning, an evaluation model configured to output an indicator indicating a result of evaluating a state in the piece of equipment 10 with respect to an intended target based on an operation target in the piece of equipment 10 and a state in the piece of equipment 10. The evaluation model generation apparatus 200 is configured to supply the generated evaluation model to the operation model generation apparatus 300.

The operation model generation apparatus 300 is configured to generate an operation model configured to output an action corresponding to the state in the piece of equipment 10 by reinforcement learning in which an output of the evaluation model generated by the evaluation model generation apparatus 200 is set as at least a part of a reward. The operation model generation apparatus 300 is configured to supply the generated operation model to the control apparatus 400.

The control apparatus 400 is configured to apply, to a controlled object in the piece of equipment 10, a manipulated variable based on the action that is output by the operation model generated by the operation model generation apparatus 300 according to the state in the piece of equipment 10. That is, the control apparatus 400 is configured to function as an AI (Artificial Intelligence) controller using an operation model generated by reinforcement learning.

At this time, the evaluation model generation apparatus 200 is configured to update the evaluation model, based on the state in the piece of equipment 10 when the controlled object has been controlled using the operation model. In response to this, the operation model generation apparatus 300 is configured to update the operation model by reinforcement learning in which an output of the updated evaluation model is set as at least a part of the reward. The control apparatus 400 is configured to control the controlled object by using the updated operation model.

In this way, in the operation system 100 according to the present embodiment, AI automatically finds a bottleneck (potential fault) in operation, and generates an indicator for improvement, as an evaluation model. AI performs trial and error based on the applied indicator, and generates an operation model that instructs a better operation method. The AI controller AI-controls the controlled object by using the operation model. Thereby, according to the operation system 100 of the present embodiment, an environment in which the piece of equipment 10 can be autonomously controlled using an AI technology is provided. The operation system 100 according to the present embodiment is configured to update the evaluation model and the operation model, based on the state in the piece of equipment under such AI control, and to AI-control the controlled object by using the updated operation model. Thereby, according to the operation system 100 of the present embodiment, a loop for improving an operation in the piece of equipment 10 can be turned autonomously. This will be described in detail.

Figure 2:
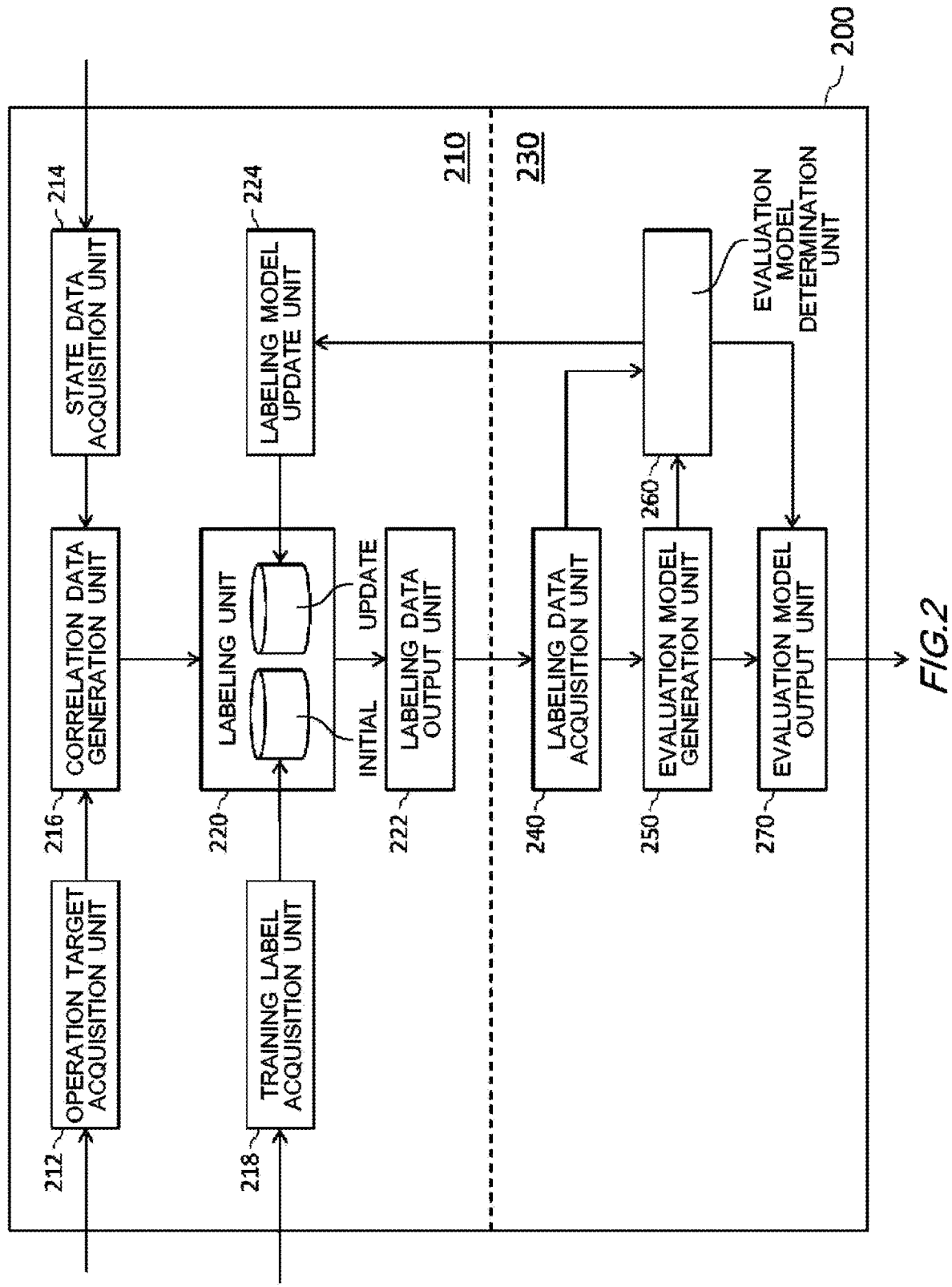
FIG. 2 shows an example of a block diagram of an evaluation model generation apparatus 200 in the operation system 100 according to the present embodiment.

FIG. 2 shows an example of a block diagram of the evaluation model generation apparatus 200 in the operation system 100 according to the present embodiment. The evaluation model generation apparatus 200 may be a computer such as a PC (personal computer), a tablet-type computer, a smart phone, a workstation, a server computer or a general-purpose computer, or a computer system in which a plurality of computers are connected. Such a computer system is also a computer in a broad sense. In addition, the evaluation model generation apparatus 200 may also be implemented by one or more virtual computer environments that can be executed in the computer. Instead of this, the evaluation model generation apparatus 200 may also be a dedicated computer designed for generation of an evaluation model or may also be dedicated hardware implemented by dedicated circuitry. In addition, when connectable to the Internet, the evaluation model generation apparatus 200 may be actualized by cloud computing.

The evaluation model generation apparatus 200 includes a labeling function unit 210 and a machine learning function unit 230. Note that although, in this drawing, a case in which the labeling function unit 210 and the machine learning function unit 230 are configured as an integral apparatus is shown as an example, it is not limited thereto. The labeling function unit 210 and the machine learning function unit 230 may be configured as separate apparatuses.

The labeling function unit 210 includes an operation target acquisition unit 212, a state data acquisition unit 214, a correlation data generation unit 216, a training label acquisition unit 218, a labeling unit 220, a labeling data output unit 222, and a labeling model update unit 224. That is, the evaluation model generation apparatus 200 includes an operation target acquisition unit 212, a state data acquisition unit 214, a correlation data generation unit 216, a training label acquisition unit 218, a labeling unit 220, a labeling data output unit 222, and a labeling model update unit 224.

The operation target acquisition unit 212 is configured to acquire an operation target in the piece of equipment 10. For example, the operation target acquisition unit 212 is configured to acquire an operation target from the headquarters 20 via a network. However, it is not limited thereto. The operation target acquisition unit 212 may also be configured to acquire an operation target from another apparatus, via various memory devices, or via a user input. The operation target acquisition unit 212 is configured to supply the acquired operation target to the correlation data generation unit 216.

The state data acquisition unit 214 is configured to acquire state data representing a state in the piece of equipment 10. For example, the state data acquisition unit 214 is configured to acquire, as state data, various physical quantities measured by various sensors provided to the piece of equipment 10 in time series from the piece of equipment 10 via a network. However, it is not limited thereto. The state data acquisition unit 214 may also be configured to acquire state data from another apparatus, via various memory devices, or via a user input. The state data acquisition unit 214 is configured to supply the acquired state data to the correlation data generation unit 216.

The correlation data generation unit 216 is configured, based on the operation target acquired by the operation target acquisition unit 212, to generate correlation data representing at least any of a correlation between at least one physical quantity included in the state data acquired by the state data acquisition unit 214 and a time or a correlation between at least two physical quantities included in the state data. At this time, the correlation data generation unit 216 may be configured to generate correlation data including a graph image obtained by graphing these correlations. The correlation data generation unit 216 is configured to supply the generated correlation data to the labeling unit 220.

The training label acquisition unit 218 is configured to acquire a training label for at least a part of the correlation data generated by the correlation data generation unit 216. For example, the training label acquisition unit 218 is configured to acquire a training label via a user (learned person or the like) input. However, it is not limited thereto. The training label acquisition unit 218 may also be configured to acquire a training label from another apparatus, via a network, or via various memory devices. The training label acquisition unit 218 is configured to supply the acquired training label to the labeling unit 220.

The labeling unit 220 is configured to label the correlation data generated by the correlation data generation unit 216 by using a labeling model generated based on the training label acquired by the training label acquisition unit 218. For example, the labeling unit 220 is configured to generate an initial labeling model by inputting, to the learning machine, data in which the training label acquired by the training label acquisition unit 218 is attached to at least a part of the correlation data generated by the correlation data generation unit 216, as training data. Then, the labeling unit 220 is configured to label the unlabeled correlation data by using the initial labeling model and a labeling model for update, which will be described later. Note that although, in the above description, the case in which the correlation data in the training data is generated by the correlation data generation unit 216 is shown as an example, it is not limited thereto. The correlation data in the training data may also be generated by a learned person or the like. In this case, instead of acquiring a training label from a learned person or the like, the training label acquisition unit 218 may be configured to acquire the training data itself to which a training label is attached, and to supply the same to the labeling unit 220. The labeling unit 220 is configured to supply the labeled correlation data to the labeling data output unit 222.

The labeling data output unit 222 is configured to generate labeling data, based on the correlation data labeled by the labeling unit 220 and sensor data (measured value of a physical quantity). The labeling data output unit 222 is configured to output the generated labeling data to the machine learning function unit 230.

The labeling model update unit 224 is configured to acquire a determination result of an evaluation model, which will be described later. Then, the labeling model update unit 224 is configured to update the labeling model when the evaluation model is determined valid. At this time, the labeling model update unit 224 may be configured to generate a labeling model for update, separately from the initial labeling model generated based on the training label.

The machine learning function unit 230 includes a labeling data acquisition unit 240, an evaluation model generation unit 250, an evaluation model determination unit 260, and an evaluation model output unit 270. That is, the evaluation model generation apparatus 200 includes a labeling data acquisition unit 240, an evaluation model generation unit 250, an evaluation model determination unit 260, and an evaluation model output unit 270.

The labeling data acquisition unit 240 is configured to acquire the labeling data output by the labeling data output unit 222. The labeling data acquisition unit 240 is configured to supply the acquired labeling data to the evaluation model generation unit 250.

The evaluation model generation unit 250 is configured to generate an evaluation model configured to output an indicator indicating a result of evaluating a state in the piece of equipment 10 with respect to an intended target based on an operation target in the piece of equipment 10 and a state in the piece of equipment 10, by using the labeling data acquired by the labeling data acquisition unit 240, i.e., the labeling data generated based on the correlation data labeled by the labeling unit 220 and the sensor data. The evaluation model generation unit 250 is configured to supply the generated evaluation model to the evaluation model determination unit 260 and the evaluation model output unit 270.

The evaluation model determination unit 260 is configured to determine validity of the evaluation model generated by the evaluation model generation unit 250. When the evaluation model determination unit 260 determines that the evaluation model is valid, the evaluation model determination unit is configured to notify the effect to the labeling model update unit 224 and the evaluation model output unit 270. In response to this, the labeling model update unit 224 is configured to update the labeling model.

When the evaluation model is determined valid, the evaluation model output unit 270 is configured to output the evaluation model to the operation model generation apparatus 300.

Regarding this, first, details of processing in the labeling function unit 210 of the evaluation model generation apparatus 200 will be described in detail using a data example and a flow.

FIG. 3 shows an example of training data that is input to the learning machine at the time when the labeling unit 220 generates an initial labeling model. As shown in this drawing, the training data that is input to the learning machine may include "operation target", "object", "tag information 1", "tag information 2", "graph image", and "label". Here, the "operation target" may include a "target item" representing a targeted item, and a "target value" regarding the target item. In addition, the "object" may include a "category" of an object segment and a "control loop" as an object. Further, the "tag information 1" may include a "name" of a tag 1, a type of "physical quantity", a "minimum value", a "maximum value", and a "unit". Further, the "tag information 2" may include a "name" of a tag 2, a type of "physical quantity", a "minimum value", a "maximum value", and a "unit".

Further, the "graph image" may be an image obtained by graphing a correlation between the tag 1 and the tag 2. For example, "xxx1.jpg" and "xxx2.jpg" may be time series images in which a concentration of tag 1 is graphed as the vertical axis and a time of tag 2 is graphed as the horizontal axis. Similarly, "xxx3.jpg" and "xxx4.jpg" may be time series images in which an acceleration of the tag 1 is graphed as the vertical axis and a time of the tag 2 is graphed as the horizontal axis. In addition, "xxx5.jpg" and "xxx6.jpg" may be distribution chart (scatter diagram) images in which a temperature of tag 1 is graphed as the vertical axis and a concentration of tag 2 is graphed as the horizontal axis. In other words, it can be said that the vertical axis in the "graph image" is defined by the "tag information 1" and the horizontal axis in the "graph image" is defined by the "tag information 2".

In addition, the "label" is a training label attached by a learned person or the like. The labeling unit 220 may be configured to generate an initial labeling model by inputting training data including these items into the learning machine. Note that although, in this drawing, a case in which both an "OK" label and an "NG" label are used as a label is shown as an example, it is not limited thereto. As the label, only the "OK" label may be used, or only the "NG" label may be used. In particular, for a use of finding a bottleneck in operation, at least the "NG" label may be used as the label.

Figure 4:
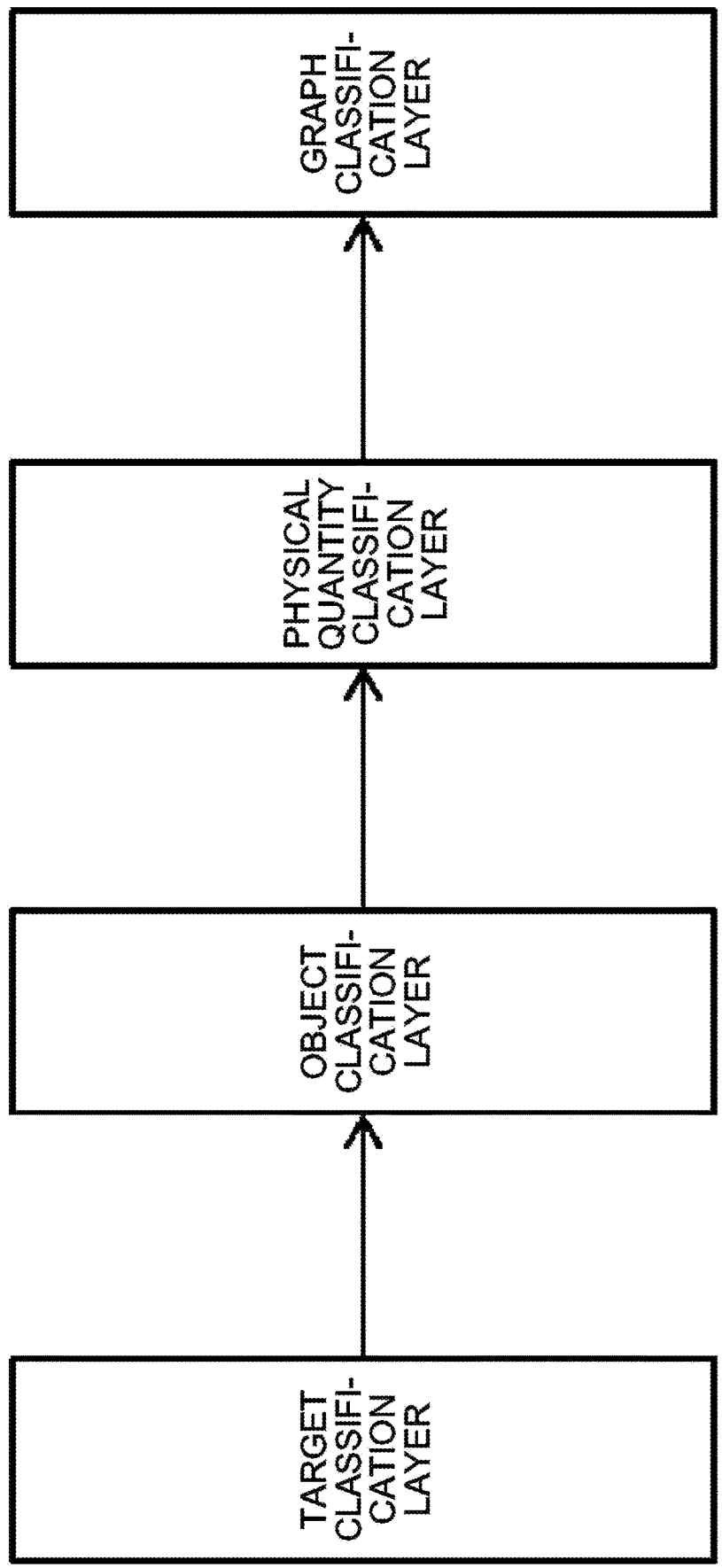
FIG. 4 shows an example of a design example of the learning machine that is used by the labeling unit 220.

FIG. 4 shows an example of a design example of the learning machine that is used by the labeling unit 220. The labeling unit 220 may use various learning algorithms as such a learning machine, and may use Deep Learning, as an example. The learning machine may have a function unit configured to classify an operation target, a function unit configured to classify an object, a function unit configured to classify a physical quantity (tag information), and a function unit configured to classify a graph image. At this time, as shown in this drawing, the learning machine may be designed to include a layer configured to respond to each item, such as a target classification layer for classifying an operation target, an object classification layer for classifying an object, a physical quantity classification layer for classifying a physical quantity, and a graph classification layer for classifying a graph image.

Figure 5:
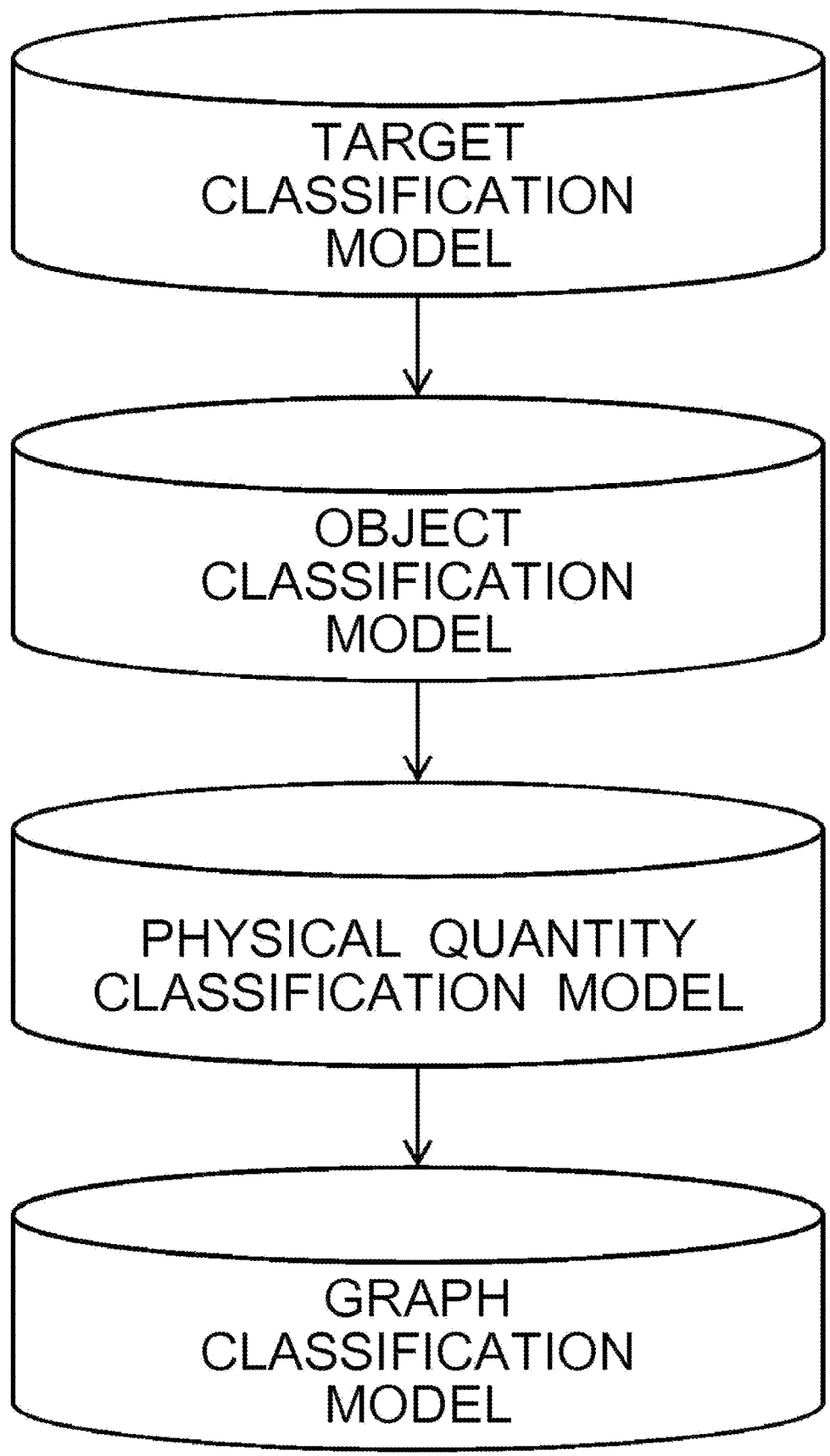
FIG. 5 shows another example of the design example of the learning machine that is used by the labeling unit 220.

FIG. 5 shows another example of the design example of the learning machine that is used by the labeling unit 220. Instead of providing the learning machine with the layer configured to respond to each item, as shown in FIG. 4, the learning machine may be designed, as shown in this drawing, to have a classifiable model for each layer, such as a target classification model for classifying an operation target, an object classification model for classifying an object, a physical quantity classification model for classifying a physical quantity, and a graph classification model for classifying a graph image.

FIG. 6 shows an example of unlabeled correlation data that is a labeling object by the labeling unit 220. As shown in this drawing, the unlabeled correlation data may include "operation target", "object", "tag information 1", "tag information 2", and "graph image". Each of these items may be similar to each item of the training data shown in FIG. 3, and therefore, the description thereof is omitted here.

FIG. 7 shows an example of an I/O list in the piece of equipment 10. In the I/O list, information of each device provided in the piece of equipment 10 is listed. Such an I/O list is appropriately referred to when generating correlation data or generating labeling data.

Figure 8:
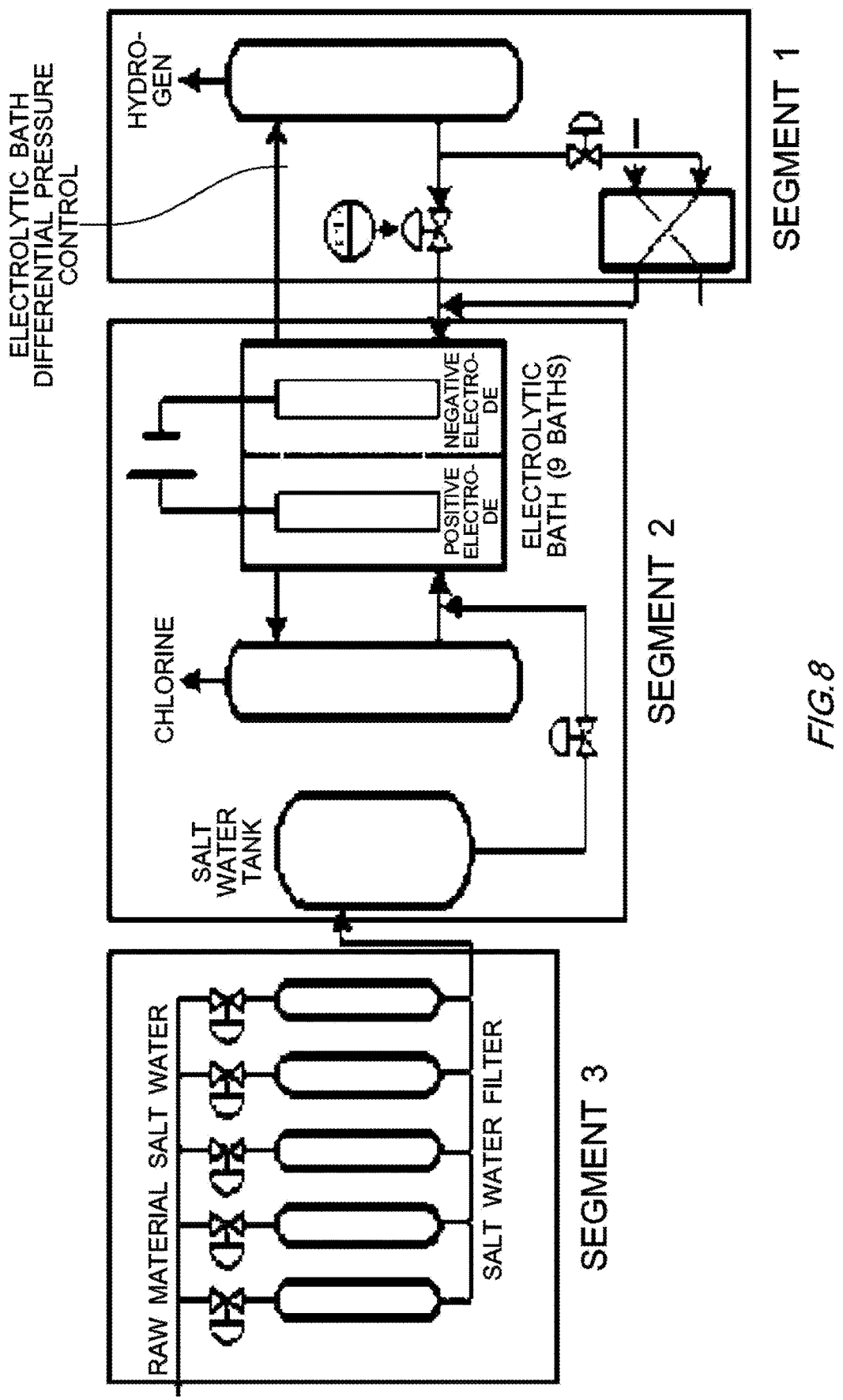
FIG. 8 shows an example of a segment diagram in the piece of equipment terminal 10.

FIG. 8 shows an example of a segment diagram in the piece of equipment 10. The segment diagram is a diagram showing a configuration of segments in the piece of equipment 10. Similar to the I/O list, the segment diagram is also appropriately referred to when generating correlation data or generating labeling data.

FIG. 9 shows an example of labeling data that is output by the labeling data output unit 222. As shown in this drawing, the labeling data may include labeling data with an "OK" label attached thereto and labeling data with an "NG" label attached thereto. Each of these labeling data includes sensor data corresponding to a sensor ID (tag name). That is, the labeling data represents what value case values measured by one or more sensors are labeled with the "OK" label and what value case the label "NG" is attached.

The labeling function unit 210 is configured to generate and output, for example, labeling data as shown in this drawing. This will be described in detail by using a flow.

Figure 10:
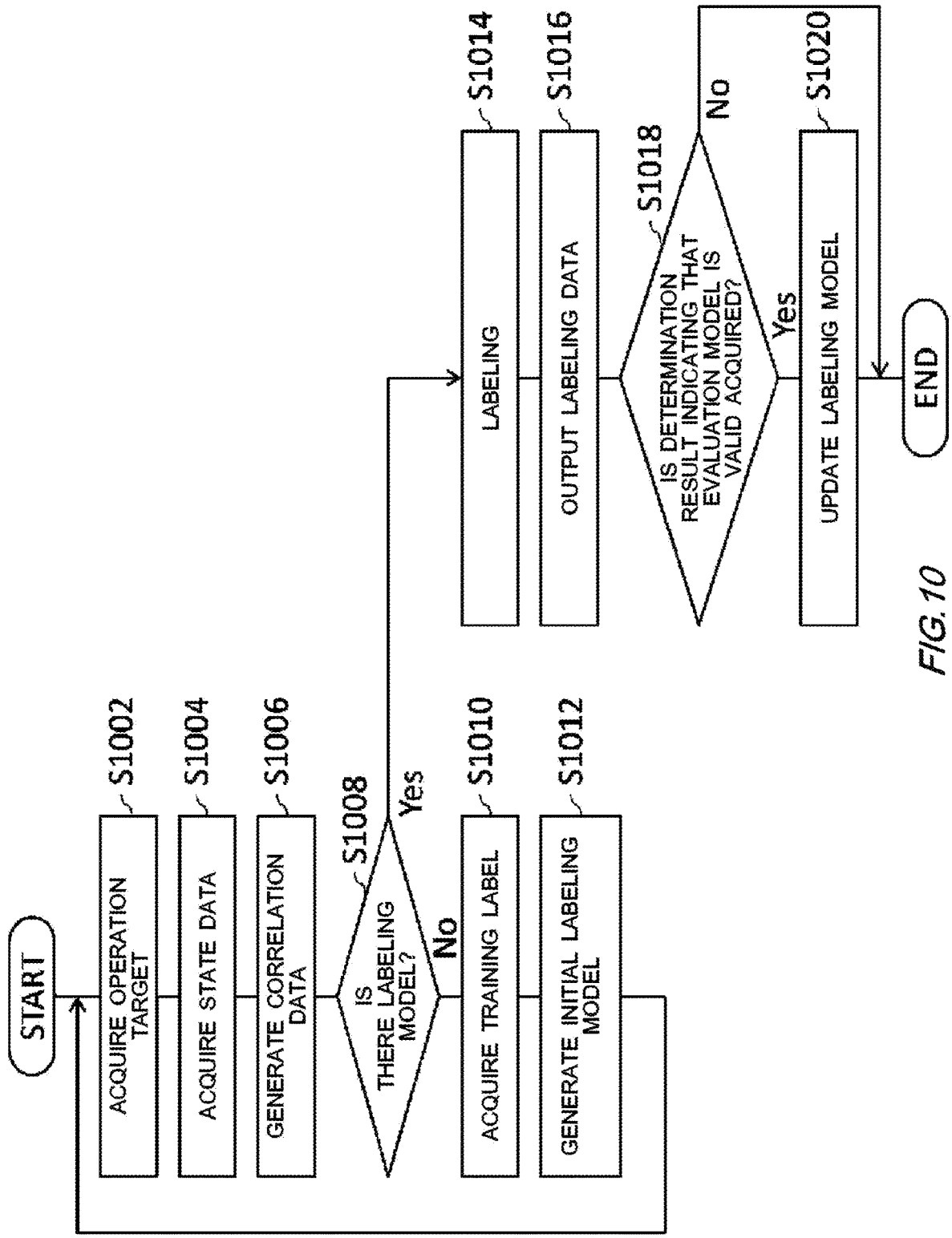
FIG. 10 shows an example of a processing flow in a labeling function unit 210 of an evaluation model generation apparatus 200.

FIG. 10 shows an example of a processing flow in the labeling function unit 210 of the evaluation model generation apparatus 200. The labeling function unit 210 of the evaluation model generation apparatus 200 may execute labeling processing, for example, according to the flow shown in this drawing.

In step S1002, the evaluation model generation apparatus 200 acquires an operation target in the piece of equipment 10. For example, the operation target acquisition unit 212 is configured to acquire an operation target from the headquarters 20 via a network. Such an operation target may include, for example, a target item representing a targeted item, and a target value regarding the target item. As an example, when the piece of equipment 10 is a plant, the operation target acquisition unit 212 may acquire a plant KPI (Key Performance Indicator: important performance evaluation indicator) as the operation target. The operation target acquisition unit 212 supplies the acquired operation target to the correlation data generation unit 216.

In step S1004, the evaluation model generation apparatus 200 acquires state data representing a state in the piece of equipment 10. For example, the state data acquisition unit 214 acquires, as state data, various physical quantities measured by various sensors provided to the piece of equipment 10 in time series from the piece of equipment 10 via a network. These physical quantities may include, for example, temperatures, concentrations, accelerations, pressures and the like at various locations in the piece of equipment 10. The state data acquisition unit 214 supplies the acquired state data to the correlation data generation unit 216.

In step S1006, the evaluation model generation apparatus 200 generates, based on the operation target, correlation data representing at least any of a correlation between at least one physical quantity included in the state data and a time or a correlation between at least two physical quantities included in the state data. For example, the correlation data generation unit 216 generates, based on the operation target acquired in step S1002, correlation data representing at least any of a correlation between at least one physical quantity included in the state data acquired in step S1004 and a time or a correlation between at least two physical quantities included in the state data. As an example, the correlation data generation unit 216 inputs the item of "operation target" by the operation target acquired in step S1002. In addition, the correlation data generation unit 216 exhaustively inputs the items of "object", "tag information 1", and "tag information 2" by referring to the I/O list shown in FIG. 7 and the segment diagram shown in FIG. 8. Then, the correlation data generation unit 216 graphs a correlation between the tag 1 and the tag 2 by defining the horizontal axis by "tag information 1" and defining the vertical axis by "tag information 2", and inputs the graphed image (for example, a time series image or a distribution chart image) to the item of "graph image". In this way, the correlation data generation unit 216 generates, for example, correlation data other than the item "training label" in the training data shown in FIG. 3 and unlabeled correlation data shown in FIG. 6. The correlation data generation unit 216 supplies the generated correlation data to the labeling unit 220.

In step S1008, the evaluation model generation apparatus 200 determines whether there is a labeling model. For example, the evaluation model generation apparatus 200 determines whether generation of a labeling model for labeling the unlabeled correlation data is completed. When it is determined that there is no labeling model (generation is not completed) (in case of No), the evaluation model generation apparatus 200 advances the processing to step S1010.

In step S1010, the evaluation model generation apparatus 200 acquires a training label for at least a part of the correlation data. For example, the training label acquisition unit 218 receives an input of the training label, in response to the correlation data generated in step S1006 being displayed. In response to this, the learned person or the like judges the correlation data, based on the graph image, attaches an "OK" label to the correlation data judged as "no problem", and attaches an "NG" label to the correlation data judged as "problem/suspicious". That is, the learned person or the like performs labeling regarding to which data attention was paid and where it is strange. The training label acquisition unit 218 acquires the training label via the user input in this way, for example. The training label acquisition unit 218 is configured to supply the acquired training label to the labeling unit 220.

In step S1012, the evaluation model generation apparatus 200 generates an initial labeling model. For example, the labeling unit 220 generates training data as shown in FIG. 3 by attaching the training label acquired in step S1010 to at least a part of the correlation data generated in step S1006.

Then, the labeling unit 220 generates an initial labeling model by inputting such training data to the learning machine shown in FIG. 4 or 5, for example. Then, the evaluation model generation apparatus 200 returns the processing to step 1002 and continues the flow. Thereafter, the evaluation model generation apparatus 200 labels the unlabeled correlation data by using the labeling model generated in this way.

After the initial labeling model is generated in step S1012, in step S1008, the evaluation model generation apparatus 200 determines that there is a labeling model (generation is completed), and advances the processing to step S1014.

In step S1014, the evaluation model generation apparatus 200 labels the correlation data generated in step S1006 by using the labeling model generated based on the training label acquired in step S1010. At this time, a range of data that is used by the graph image may be associated based on the operation target, and the range may be narrowed down using the data used at the time of generating the initial labeling model. For example, the labeling unit 220 inputs the unlabeled correlation data to the initial labeling model and the labeling model for update generated in step S1012. In response to this, the labeling model classifies the operation target, classifies the object, classifies the physical quantity, and classifies the graph image. That is, the labeling model identifies data in which an operation target is common or similar, identifies data in which an object is common or similar, and identifies data in which a physical quantity is common or similar. Then, the labeling model compares the graph images identified in this way, and attaches, to the unlabeled correlation data, an "OK" label when the graph image is similar to the graph image to which an "OK" label is attached, and an "NG" label when the graph image is similar to the graph image to which an "NG" label is attached. At this time, the labeling model may discriminate similarity in a form of a graph by using data as an image, or whether data waveforms are similar by using RNN (Recurrent Neural Network), LSTM (Long Short Term Memory), or the like.

The labeling unit 220 may attach an "OK" label to correlation data in which the initial labeling model is classified as "OK" and the labeling model for update is classified as "OK". Similarly, the labeling unit 220 may attach an "NG" label to correlation data in which the initial labeling model is classified as "NG" and the labeling model for update is classified as "NG". That is, the labeling unit 220 may label correlation data by a logical product of a classification result of the initial labeling model and a classification result of the labeling model for update. However, it is also conceivable that the initial labeling model and the labeling model for update show different classification results. In this case, the labeling unit 220 may give priority to the classification result of the initial labeling model. Instead of this, the labeling unit 220 may give priority to the classification result of the labeling model for update. Alternatively, the labeling unit 220 may label correlation data by a logical add of the classification result of the initial labeling model and the classification result of the labeling model for update. The labeling unit 220 supplies the correlation data labeled in this way to the labeling data output unit 222.

In step S1016, the evaluation model generation apparatus 200 outputs the labeling data. For example, the labeling data output unit 222 generates, for example, labeling data as shown in FIG. 9, based on the correlation data labeled in step S1014 and the sensor data. Then, the labeling data output unit 222 outputs the generated labeling data to the machine learning function unit 230.

In step S1018, the evaluation model generation apparatus 200 determines whether a determination result indicating that the evaluation model is valid has been acquired. When it is determined that the determination result has not been acquired (in case of No), the evaluation model generation apparatus 200 ends the flow. On the other hand, when it is determined that the determination result has been acquired (in case of Yes), the evaluation model generation apparatus 200 advances the processing to step S1020.

In step S1020, the evaluation model generation apparatus 200 updates the labeling model when it is determined that the determination result indicating that the evaluation model is valid has been acquired. For example, the labeling model update unit 224 generates a labeling model for update, separately from the initial labeling model generated based on the training label, and updates the labeling model for update. In general, it is considered that a training label given by a learned person or the like is more reliable than a label given by the learning machine. Therefore, the labeling model update unit 224 does not update the initial labeling model, but updates the labeling model for update generated separately from the initial labeling model, so that it is possible to avoid a gradual decrease in degree of influence of the training label given by a learned person or the like. However, it is not limited thereto, and a case where the labeling model update unit 224 updates the initial labeling model is not excluded.

The labeling function unit 210 of the evaluation model generation apparatus 200 may execute the labeling processing in this way, for example. Next, details of processing in the machine learning function unit 230 of the evaluation model generation apparatus 200 will be described in detail using a data example and a flow.

Figure 11:
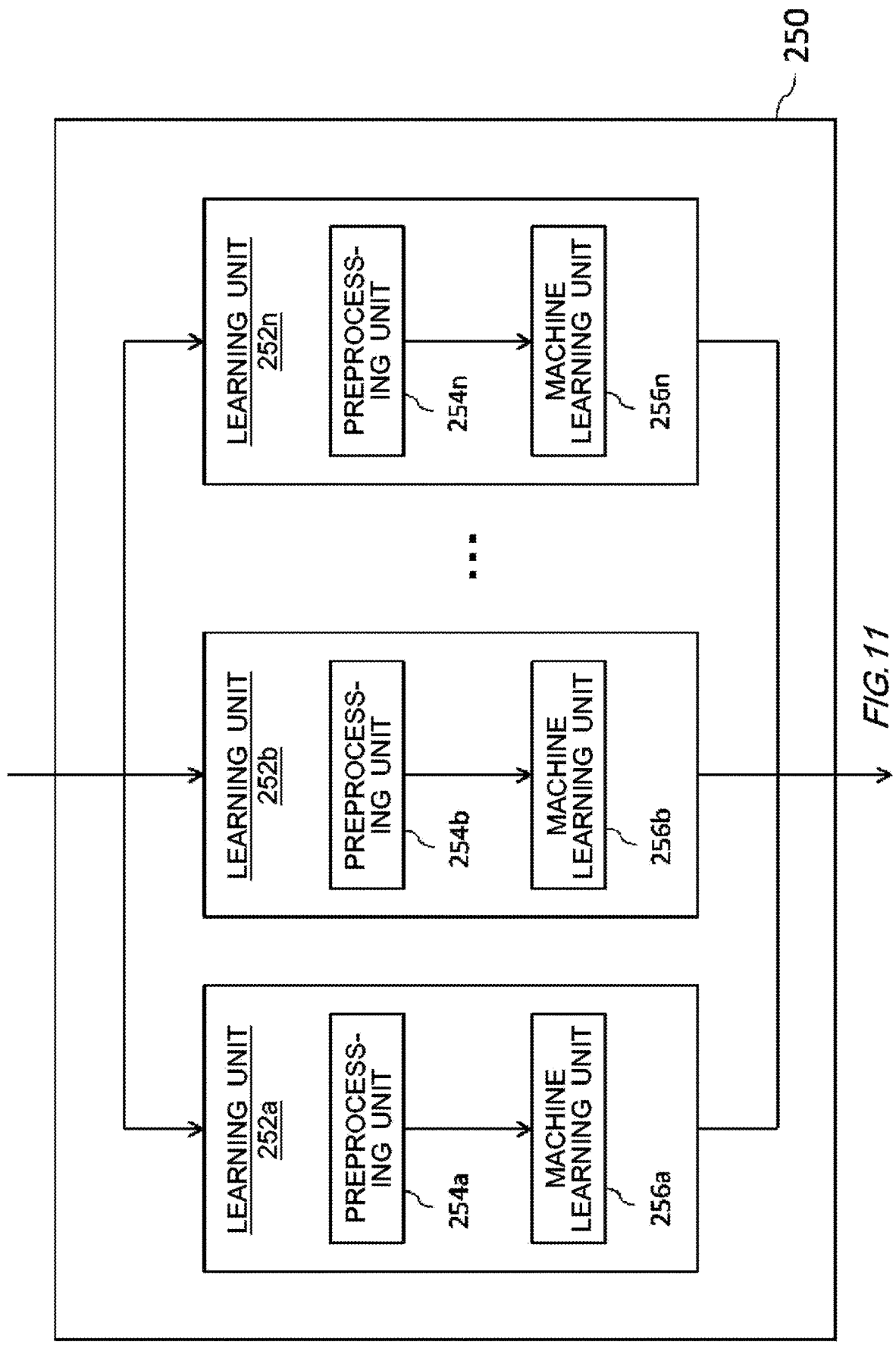
FIG. 11 shows an example of a block diagram of an evaluation model generation unit 250.

FIG. 11 shows an example of a block diagram of the evaluation model generation unit 250. The evaluation model generation unit 250 has a plurality of learning units 252a, 252b, . . . , and a learning unit 252n (collectively referred to as "learning unit 252"), and the plurality of learning units 252 are configured to execute learning in parallel. The learning unit 252a includes a preprocessing unit 254a and a machine learning unit 256a. Similarly, the learning unit 252b includes a preprocessing unit 254b and a machine learning unit 256b. Similarly, the learning unit 252c includes a preprocessing unit 254c and a machine learning unit 256c. Here, the preprocessing units 254a, 254b, . . . , 254n are collectively referred to as "preprocessing unit 254". In addition, the machine learning units 256a, 256b, . . . , 256n are collectively referred to as "machine learning unit 256".

The preprocessing unit 254 is configured to pre-process the labeling data. For example, the preprocessing unit 254 is configured to execute processing such as standardization processing, normalization processing, low-pass filter, high-pass filter, and principal component analysis on the labeling data. The preprocessing unit 254 is configured to supply the pre-processed labeling data to the machine learning unit 256.

The machine learning unit 256 is configured to generate an evaluation model by a machine learning algorithm using the labeling data pre-processed by the preprocessing unit 254 as learning data.

In this way, the evaluation model generation unit 250 includes the plurality of learning units 252, and each of the plurality of learning units 252 includes the machine learning unit 256. Thereby, the evaluation model generation unit 250 is configured to generate a plurality of evaluation models by the respective learning units 252. At this time, in the plurality of learning units 252, at least any of processing contents of the preprocessing units 254 or algorithms of the machine learning units 256 may be different. Thereby, the evaluation model generation unit 250 can generate a plurality of different evaluation models. The evaluation model generated in this way may be configured to output numerically whether it is close to an OK training or an NG training with respect to the sensor data, for example.

Figure 12:
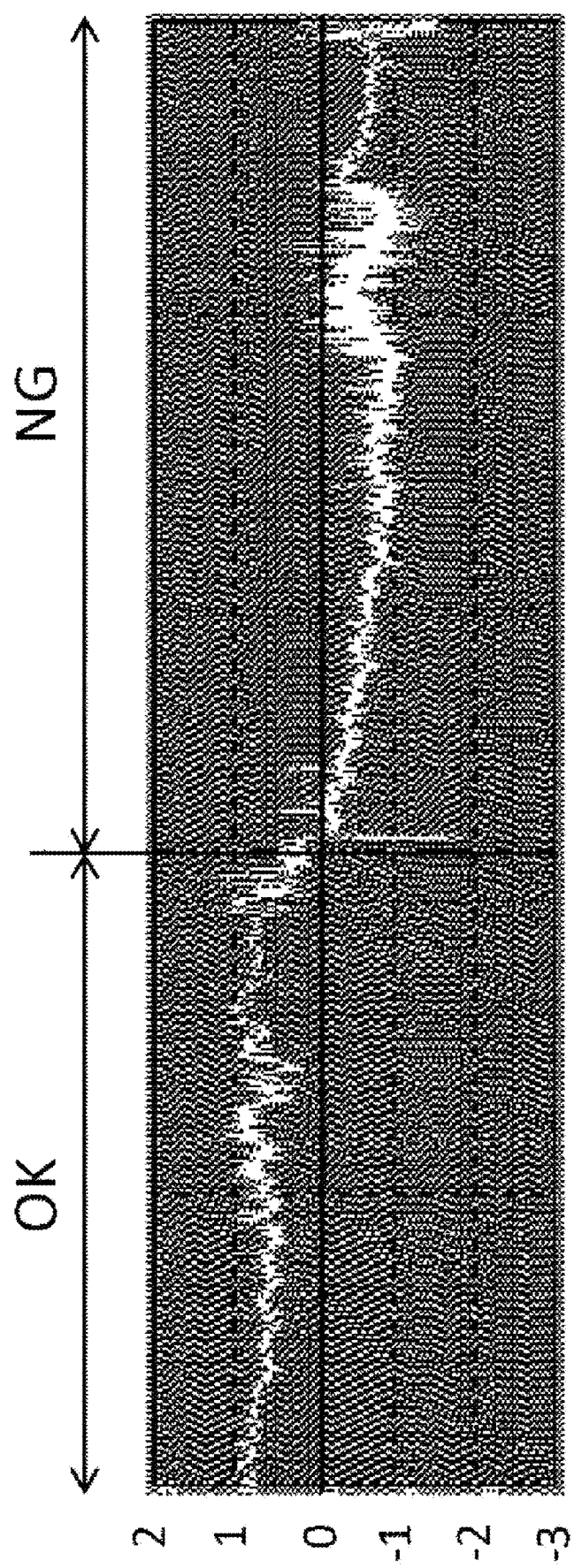
FIG. 12 shows an example of an output of an evaluation model.

FIG. 12 shows an example of the output of the evaluation model. In this drawing, as an example, an output of an evaluation model in which quality improvement on an intended quality in an operation target is targeted is shown. In this drawing, the vertical axis represents a health index. As an example, such an evaluation model outputs a health index=0 when it is estimated that the intended target becomes the same value as the target value. Then, the evaluation model outputs a value larger than 0 as it is estimated that the intended target is better than the target value, and outputs a value smaller than 0 as it is estimated that the intended target is worse than the target value.

In addition, in this drawing, the horizontal axis represents time. As an example, the anterior half of the horizontal axis in this drawing shows, as an example, a case in which data for a period with an "OK" label attached is input to the evaluation model. In this case, it can be said that the evaluation model is valid because the higher the rate of outputting a value equal to or larger than 0 in the above period is, the higher the rate of correct answer with the labeling is. Similarly, the posterior half of the horizontal axis in this drawing shows a case in which data for a period with an "NG" label attached is input to the evaluation model. In this case, it can be said that the evaluation model is valid because the higher the rate of outputting a value less than 0 in the above period is, the higher the rate of correct answer with the labeling is.

Figure 13:
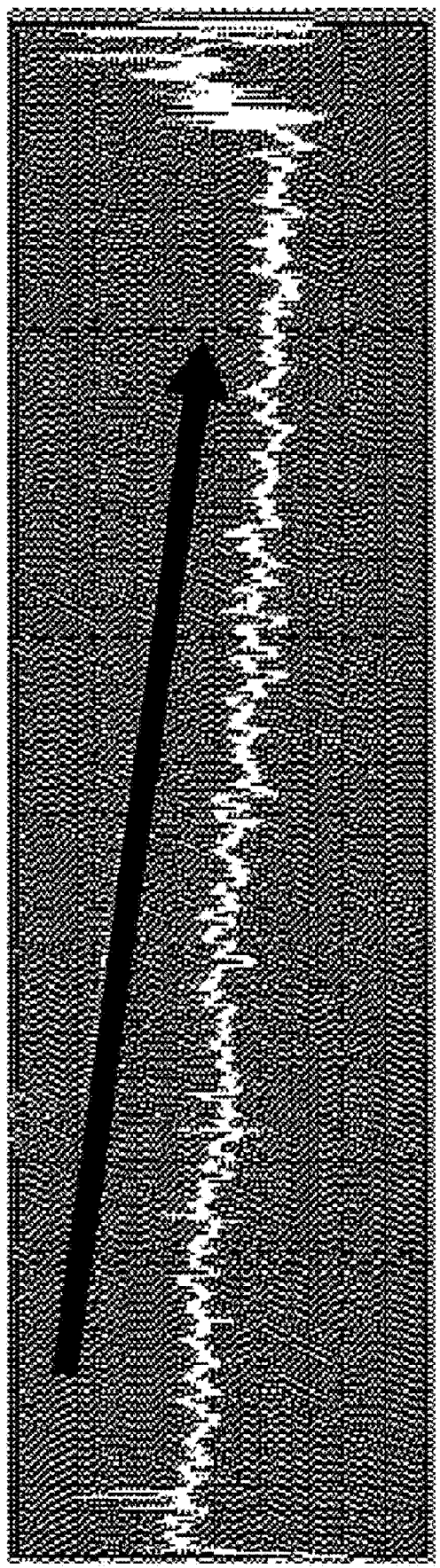
FIG. 13 shows another example of the output of the evaluation model.

FIG. 13 shows another example of the output of the evaluation model. In this drawing, as an example, an output of an evaluation model in which extension (cost cut) of the intended catalyst use in an operation target is targeted is shown. In this drawing, the vertical axis represents a health index. In addition, in this drawing, the horizontal axis represents time. In general, a phenomenon that the catalyst gradually decreases over time occurs. Therefore, it can be said that the evaluation model is valid because the evaluation model accurately captures the phenomenon as the output has a monotonically decreasing property, as indicated by an arrow in this drawing. The machine learning function unit 230 of the evaluation model generation apparatus 200 is configured to generate, for example, an evaluation model capable of outputting such a result.

Figure 14:
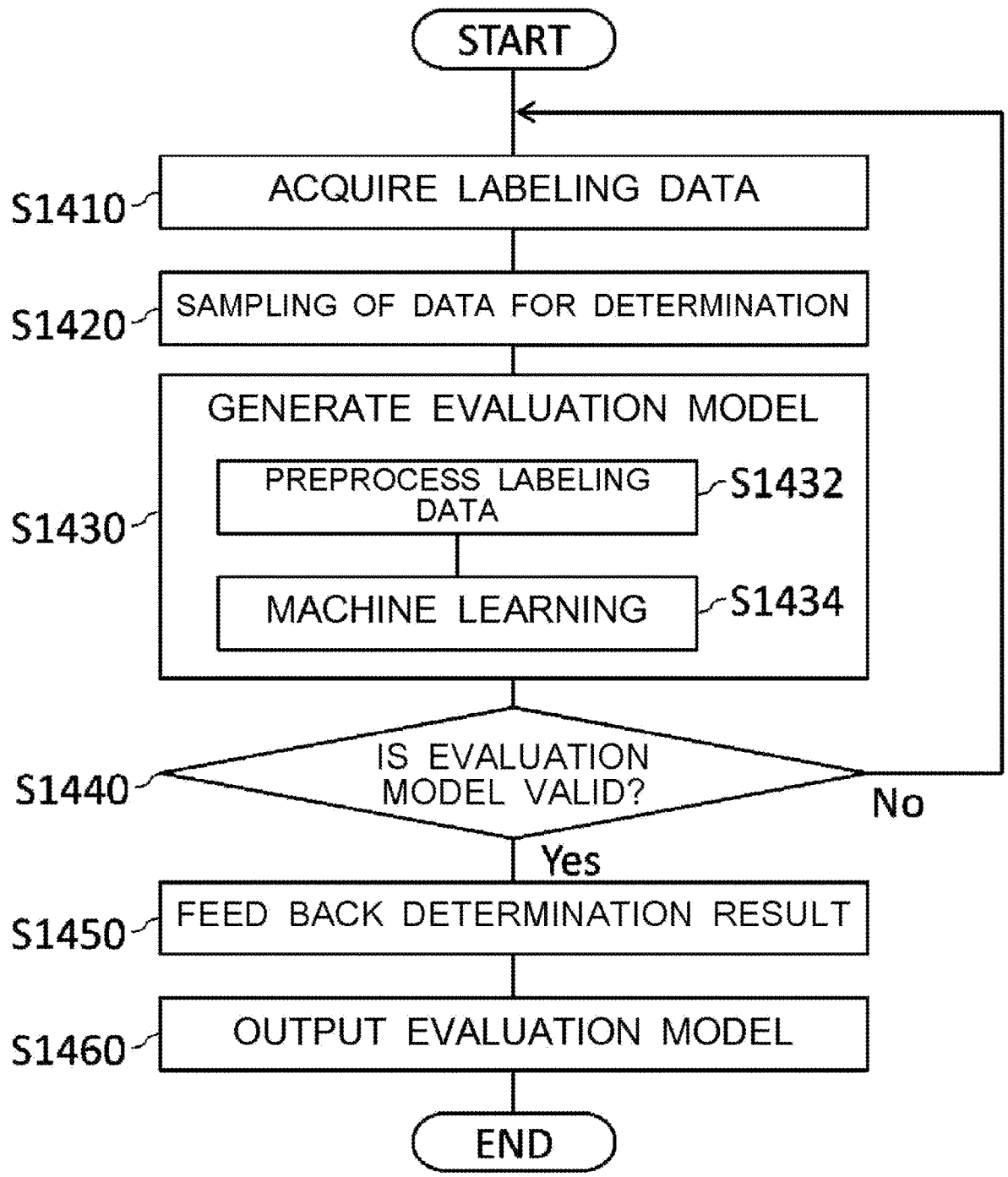
FIG. 14 shows an example of a processing flow in a machine learning function unit 230 of the evaluation model generation apparatus 200.

FIG. 14 shows an example of a processing flow in the machine learning function unit 230 of the evaluation model generation apparatus 200. The machine learning function unit 230 of the evaluation model generation apparatus 200 may execute generation processing of an evaluation model by machine learning, for example, according to the flow shown in this drawing.

In step S1410, the evaluation model generation apparatus 200 acquire labeling data. For example, the labeling data acquisition unit 240 acquires the labeling data output in step S1016 in the flow of FIG. 10. As an example, the labeling data acquisition unit 240 may acquire the labeling data as shown in FIG. 9.

In step S1420, the evaluation model generation apparatus 200 samples data for determination. For example, the labeling data acquisition unit 240 samples a part of the labeling data acquired in step S1410, as data for determination. As an example, the labeling data acquisition unit 240 may randomly sample data for determination from the acquired labeling data. Instead of this, the labeling data acquisition unit 240 may sample an anterior half of the acquired labeling data as data for machine learning and a posterior half as data for determination. The labeling data acquisition unit 240 supplies the sampled data for determination to the evaluation model determination unit 260. In addition, the labeling data acquisition unit 240 supplies the remaining labeling data to the evaluation model generation unit 250, as data for machine learning.

In step S1430, the evaluation model generation apparatus 200 generates an evaluation model that outputs an indicator indicating a result of evaluating a state in the piece of equipment 10 with respect to an intended target based on an operation target in the piece of equipment 10 and a state in the piece of equipment 10, by using the labeling data supplied in step S1420, i.e., the labeling data generated based on the correlation data labeled in step S1014 in the flow of FIG. 10 and the sensor data.

More specifically, in step S1432, the evaluation model generation apparatus 200 pre-processes the labeling data. For example, the preprocessing units 254a, 254b, ..., 254n execute processing such as standardization processing, normalization processing, low-pass filter, high-pass filter, and principal component analysis on the labeling data supplied in step S1420, respectively. At this time, the preprocessing units 254a, 254b, ..., 254n may execute different processing contents, respectively. The preprocessing units 254a, 254b, ..., 254n supply the pre-processed labeling data to the machine learning units 256a, 256b, ..., 256n, respectively.

In step S1434, the evaluation model generation apparatus 200 executes machine learning. For example, each of the machine learning units 256a, 256b, ..., 256n generates an evaluation model by a machine learning algorithm using the labeling data pre-processed in step S1432 as learning data. At this time, the machine learning units 256a, 256b, ..., 256n may execute machine learning by different algorithms, respectively. Therefore, the learning units 252a, 252b, ..., 252n may generate a plurality of evaluation models different from each other by executing processing in which at least any of the preprocessing content or the machine learning algorithm is different. Such an evaluation model may be, as an example, a model that outputs a result as shown in FIG. 12 or FIG. 13, in response to input of data. The evaluation model generation unit 250 supplies the evaluation model generated in this way to the evaluation model determination unit 260 and the evaluation model output unit 270.

In step S1440, the evaluation model generation apparatus 200 determines validity of the evaluation model. For example, the evaluation model determination unit 260 determines validity of each of the plurality of evaluation models by inputting the data for determination sampled in step S1420 to each of the plurality of evaluation models generated by the plurality of learning units 252 of the evaluation model generation unit 250.

At this time, as an example, in a case where the generated evaluation model is an evaluation model that outputs a result as shown in FIG. 12, the evaluation model determination unit 260 may determine that the evaluation model is valid, when a ratio (percentage of correct answer to the "OK" label) that the evaluation model outputs a value equal to or larger than 0 in response to an input of data for determination with an "OK" label attached thereto exceeds a predetermined threshold. Instead of or in addition to this, in a case where the generated evaluation model is an evaluation model that outputs a result as shown in FIG. 12, the evaluation model determination unit 260 may determine that the evaluation model is valid, when a ratio (percentage of correct answer to the "NG" label) that the evaluation model outputs a value less than 0 in response to an input of data for determination with an "NG" label attached thereto exceeds a predetermined threshold. As another example, in a case where the generated evaluation model is an evaluation model that outputs a result as shown in FIG. 13, the evaluation model determination unit 260 may determine that the evaluation model is valid, when the evaluation model outputs a result having a monotonic decrease in response to an input of data for determination.

When it is determined that none of the generated evaluation models is valid (in case of No), the evaluation model generation apparatus 200 returns the processing to step S1410 and continues the flow. On the other hand, when it is determined that at least any of the generated evaluation models is valid (in case of Yes), the evaluation model generation apparatus 200 advances the processing to step S1450.

In step S1450, the evaluation model generation apparatus 200 feeds back the determination result. For example, the evaluation model determination unit 260 notifies the labeling model update unit 224 that the evaluation model has been determined valid, together with information of specifying the labeling data at the time of obtaining the determination, i.e., the labeling data acquired in step S1410. In response to this, the labeling model update unit 224 updates the labeling model. In addition, the evaluation model determination unit 260 notifies the evaluation model output unit 270 that the evaluation model has been determined valid, together with information of identifying the evaluation model determined valid.

In step S1460, the evaluation model generation apparatus 200 outputs the evaluation model. For example, when the evaluation model output unit 270 receives the notification indicating that the evaluation model is valid in step S1450, the evaluation model output unit outputs the evaluation model determined valid to the operation model generation apparatus 300.

The machine learning function unit 230 of the evaluation model generation apparatus 200 may execute, for example, the generation processing of the evaluation model by machine learning in this way. That is, the evaluation model generation apparatus 200 executes the labeling processing according to the flow of FIG. 10, and executes the generation processing of the evaluation model according to the flow of FIG. 14. Then, the evaluation model generation apparatus 200 outputs the generated evaluation model to the operation model generation apparatus 300.

Figure 15:
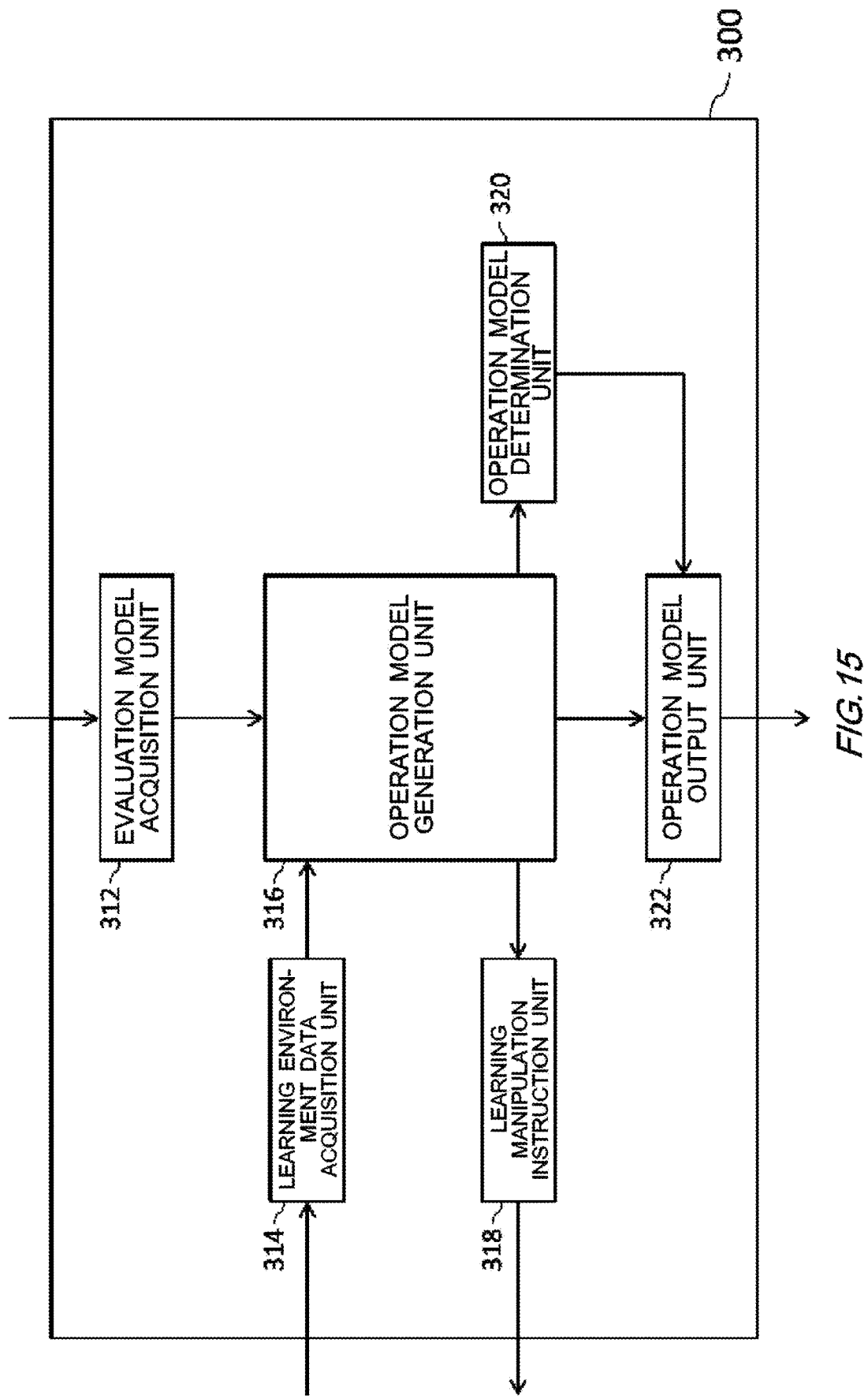
FIG. 15 shows an example of a block diagram of an operation model generation apparatus 300 in the operation system 100 according to the present embodiment.

FIG. 15 shows an example of a block diagram of the operation model generation apparatus 300 in the operation system 100 according to the present embodiment. Similar to the evaluation model generation apparatus 200, the operation model generation apparatus 300 may be a computer or a computer system in which a plurality of computers are connected. The operation model generation apparatus 300 may be implemented by one or more virtual computer environments that can be executed in the computer. Instead of this, the operation model generation apparatus 300 may also be a dedicated computer designed for generation of an operation model or dedicated hardware implemented by dedicated circuitry. Moreover, when connectable to the Internet, the operation model generation apparatus 300 may be implement by cloud computing.

The operation model generation apparatus 300 includes an evaluation model acquisition unit 312, a learning environment data acquisition unit 314, an operation model generation unit 316, a learning manipulation instruction unit 318, an operation model determination unit 320, and an operation model output unit 322.

The evaluation model acquisition unit 312 is configured to acquire an evaluation model output by the evaluation model output unit 238, via a network, for example. However, it is not limited thereto. The evaluation model acquisition unit 312 may also be configured to acquire the evaluation model via various memory devices, or via a user input. The evaluation model acquisition unit 312 is configured to supply the acquired evaluation model to the operation model generation unit 316.

The learning environment data acquisition unit 314 is configured to acquire learning environment data representing a state in a learning environment via a network. However, it is not limited thereto. The learning environment data acquisition unit 314 may also be configured to acquire the learning environment data via various memory devices, or via a user input. The learning environment data acquisition unit 314 is configured to supply the acquired learning environment data to the operation model generation unit 316.

The operation model generation unit 316 is configured to generate an operation model configured to output an action corresponding to a state in the piece of equipment 10 by reinforcement learning in which the output of the evaluation model acquired by the evaluation model acquisition unit 312 is set as at least a part of a reward, by using the learning environment data acquired by the learning environment data acquisition unit 314. The operation model generation unit 316 is configured to supply the generated operation model to the operation model determination unit 320 and the operation model output unit 322.

The learning manipulation instruction unit 318 is configured to apply a manipulated variable based on the action output by the operation model under reinforcement learning to a controlled object in the learning environment.

The operation model determination unit 320 is configured to determine validity of the operation model generated by the operation model generation unit 316. When the operation model determination unit 320 determines that the operation model is valid, the operation model determination unit notifies the effect to the operation model output unit 322.

When the operation model is determined valid, the operation model output unit 322 is configured to output the operation model to the control apparatus 400. Details of the processing in such operation model generation apparatus 300 will be described in detail using a data example and a flow.

FIG. 16 shows an example of an operation model that is generated by the operation model generation apparatus 300. An operation model is configured by a combination (s, a) of a state s representing a set of sampled state data and an action a taken under each state, and a weight w calculated by a reward. Note that, the output of the evaluation model generated by the evaluation model generation apparatus 200 is used as at least a part of the reward for calculating the weight. In this drawing, as an example, a case where the state s=(TI001, TI002, TI003, FI001, FI002, VI001) is shown. In this drawing, for example, when an action of a=1 is taken under the state of s=(−2.47803, −2.48413, −0.07324, 29.71191, 24.2511, 70), the weight calculated by the reward is w=144.1484. A next action is decided by this operation model.

FIG. 17 shows an example of an action decision table. The action decision table is configured by an input state s and an action a that can be taken. In this drawing, as an example, the input state is s=(0.1, 0.2, 0.4, 0.3, 0.8, 0.2), and the action that can be taken is five cases of a=(−3, −1, 0, 1, 3). For example, a next action is decided by inputting this action decision table into the operation model shown in FIG. 16. This will be described in detail by using a flow.

Figure 18:
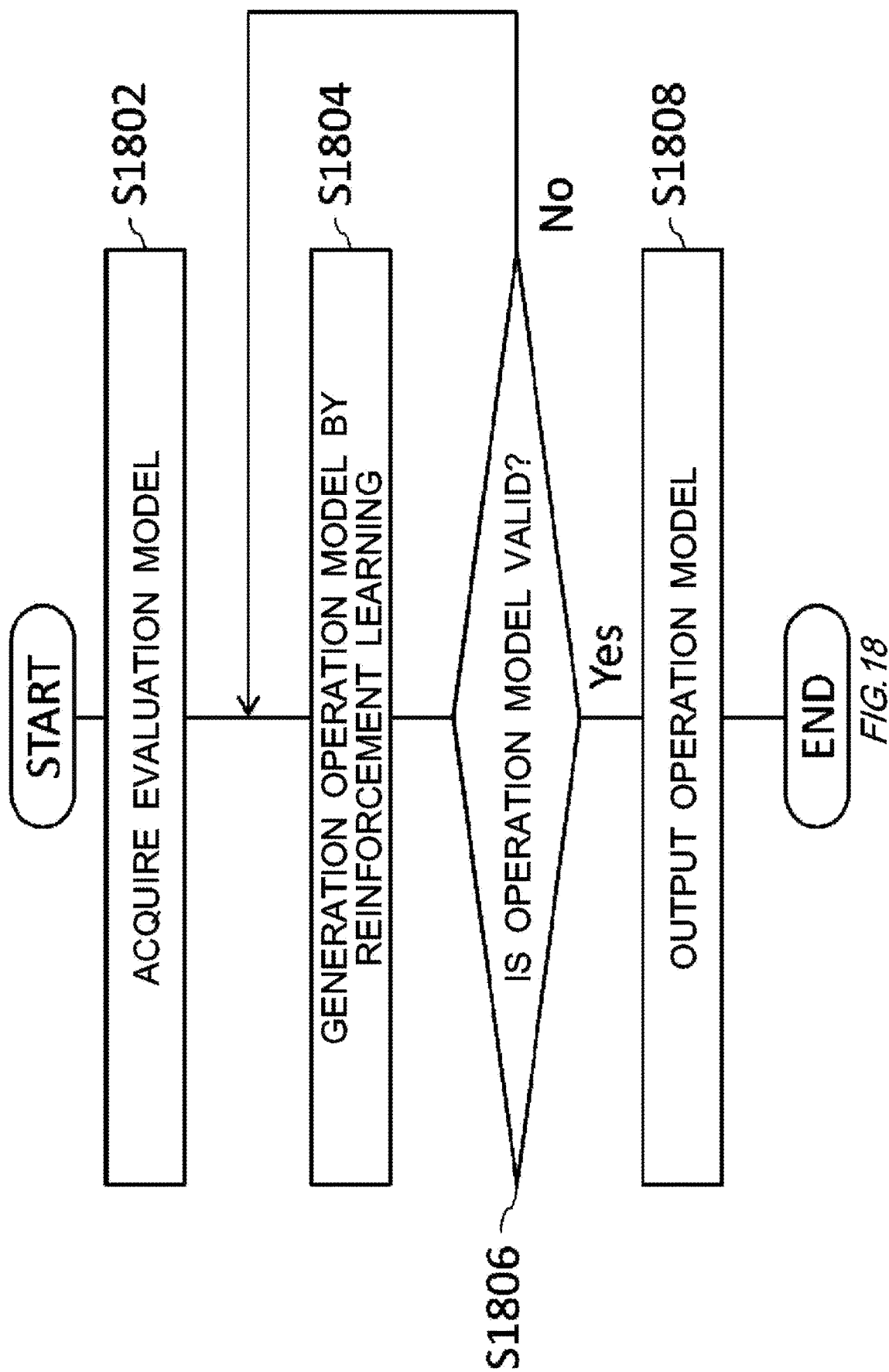
FIG. 18 shows an example of a processing flow in the operation model generation apparatus 300.

FIG. 18 shows an example of a processing flow in the operation model generation apparatus 300. The operation model generation apparatus 300 may execute generation processing of an operation model according to the flow shown in this drawing, for example.

In step S1802, the operation model generation apparatus 300 acquires an evaluation model. For example, the evaluation model acquisition unit 312 acquires the evaluation model output in step S1460 in the flow of FIG. 14, via a network. The evaluation model acquisition unit 312 supplies the acquired evaluation model to the operation model generation unit 316.

In step S1804, the operation model generation apparatus 300 generates an operation model by reinforcement learning. For example, the operation model generation unit 316 generates an operation model that outputs an action corresponding to a state in the piece of equipment 10 by reinforcement learning in which the output of the evaluation model acquired in step S1802 is set as at least a part of a reward. As an example, the operation model generation unit 316 generates an operation model as shown in FIG. 16. This detail will be described later using a separate flow. The operation model generation unit 316 supplies the generated operation model to the operation model determination unit 320 and the operation model output unit 322.

In step S1806, the operation model generation apparatus 300 determines validity of the operation model. For example, the operation model determination unit 320 determines validity of the operation model generated in step S1804. As an example, the operation model determination unit 320 prepares, as reference data, data (a) at the time when a manipulation by the user is input to a plant simulator or past data (b) of a manipulation by the user, based on information on a target setting set by the evaluation model generation apparatus 200, a manipulation stage, and an observation point. Next, the operation model determination unit 320 operates the operation model on the plant simulator with respect to the generated operation model (c). At this time, the operation model determination unit 320 may use an actual device, instead of the plant simulator. The operation model determination unit 320 determines validity of the operation model by mutually comparing a result output by (c) and (a) or (b). That is, the operation model determination unit 320 determines validity of the operation model by mutually comparing the reference data at the time when a manipulation by the user is input to the plant simulator, and a result at the time of manipulation by AI. The operation model determination unit 320 determines that the generated operation model is valid (good), when the result at the time of manipulation by AI is higher. When the operation model determination unit 320 determines that the operation model is valid, the operation model determination unit notifies the effect to the operation model output unit 322.

In step S1808, the operation model generation apparatus 300 outputs the operation model. For example, when the operation model is determined valid in step S1806, the operation model output unit 322 outputs the operation model to the control apparatus 400.

Figure 19:
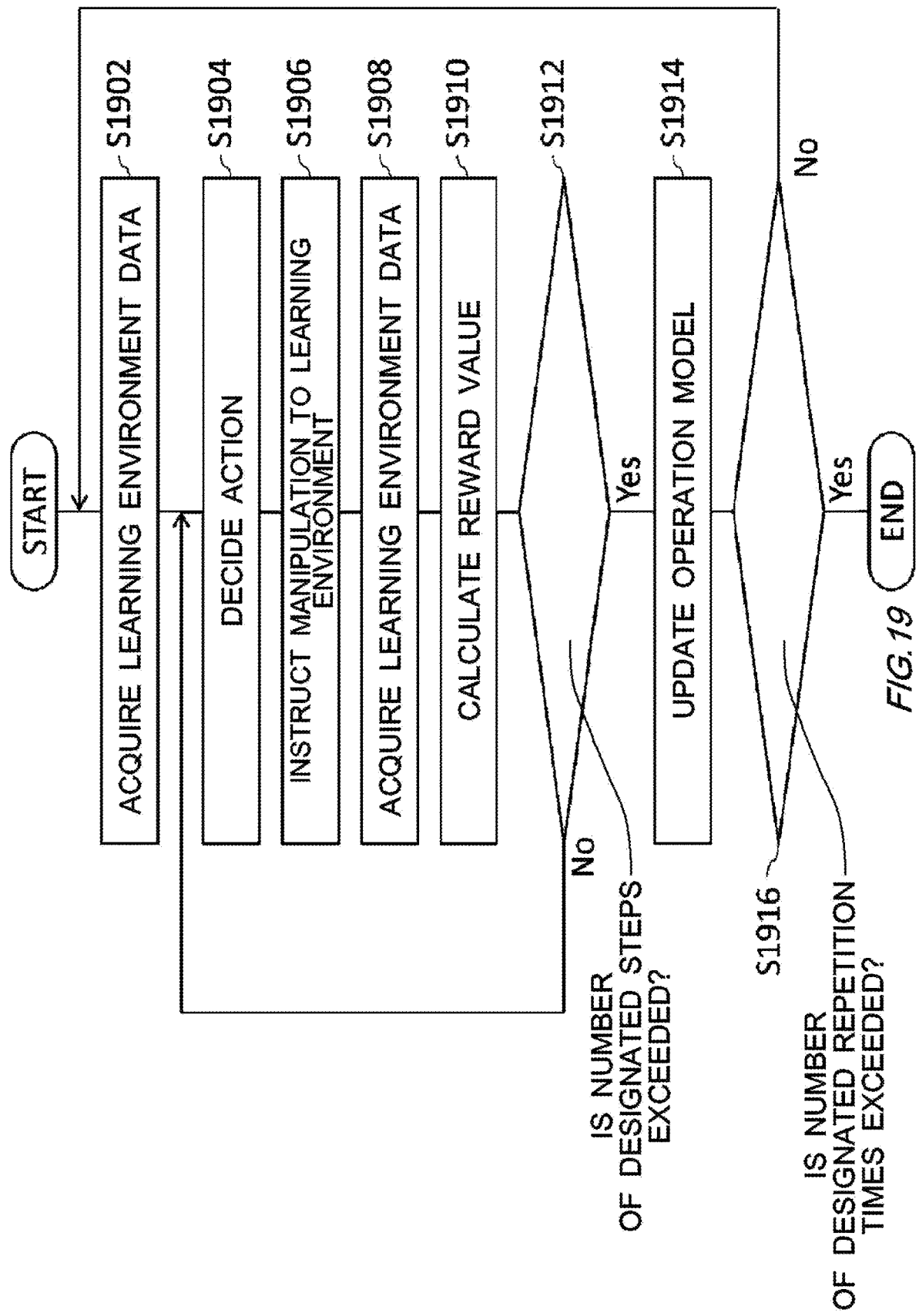
FIG. 19 shows an example of a reinforcement learning flow in an operation model generation unit 316.

FIG. 19 shows an example of a reinforcement learning flow in the operation model generation unit 316. The operation model generation unit 316 may execute the processing in step S1804 of FIG. 18 according to the flow shown in this drawing, for example.

In step S1902, the operation model generation apparatus 300 acquire learning environment data. For example, the learning environment data acquisition unit 314 acquires learning environment data representing a state in the learning environment, via a network. As such a learning environment, a simulator configured to simulate a behavior of the piece of equipment 10 may be used, or the actual piece of equipment 10 may be used. For example, when the piece of equipment 10 is a plant, a plant simulator may be used as a learning environment, or a plant may be actually used. The learning environment data acquisition unit 314 supplies the acquired learning environment data to the operation model generation unit 316.

In step S1904, the operation model generation apparatus 300 decides an action. For example, the operation model generation unit 316 randomly decides an action. Note that although, in the above descriptions, the case where the operation model generation unit 316 randomly decides an action has been shown as an example, it is not limited thereto. For example, a known AI algorithm such as FKDPP (Factorial Kernel Dynamic Policy Programming) may be used at the time when the operation model generation unit 316 decides an action. When using such a kernel method, the operation model generation unit 316 generates a vector of the state s from the sensor value obtained by the learning environment data. Next, the operation model generation unit 316 generates a combination of the state s and all the actions a that can be taken, as the action decision table as shown in FIG. 17, for example. Then, the operation model generation unit 316 inputs the action decision table to the operation model as shown in FIG. 16, for example. In response to this, the operation model performs a kernel calculation between each row of the action decision table and each sample data except the weight column in the operation model, and calculates a distance with each sample data, respectively. Then, the operation model sequentially adds up all values obtained by multiplying each value of the weight column by the distance calculated with respect to each sample data, and calculates a reward expectation value in each action. The operation model selects an action with the highest reward expectation value calculated in this way. In this way, for example, the operation model generation unit 316 may decide an action by selecting the action judged to have the highest reward expectation value by using the operation model under update. At the time of learning, the operation model generation unit 316 may decide an action while appropriately selecting whether to decide an action at random or to decide an action by using an operation model. The operation model generation unit 316 supplies the decided action to the learning manipulation instruction unit 318.

In step S1906, the operation model generation apparatus 300 instructs a manipulation to the learning environment. For example, the learning manipulation instruction unit 318 applies, to the controlled object in the learning environment, a manipulated variable obtained by adding the action decided in step S1904 to a value of the controlled object (valve value, or the like) in the learning environment. This varies a state of the learning environment.

In step S1908, the operation model generation apparatus 300 acquires learning environment data. For example, similar to step S1902, the learning environment data acquisition unit 314 acquires learning environment data representing the state in the learning environment. That is, the learning environment data acquisition unit 314 acquires the state of the learning environment that has varied in response to the manipulated variable based on the decided action being applied to the controlled object. The learning environment data acquisition unit 314 supplies the acquired learning environment data to the operation model generation unit 316.

In step S1910, the operation model generation apparatus 300 calculates a reward value. For example, the operation model generation unit 316 calculates a reward value, based on at least a part of the output of the evaluation model. As an example, the operation model generation unit 316 may calculate a reward value by using an indicator, as it is, which is output by the evaluation model in response to inputting the learning environment data acquired in step S1908 to the evaluation model acquired in step S1802 of FIG. 18, or may calculate a reward as 1 when OK is judged by the evaluation model and as 0 when NG is judged.

In step S1912, the operation model generation apparatus 300 determines whether the acquisition processing of the state corresponding to the decision of the action has exceeded a designated number of steps. In addition, the number of such steps may be designated in advance by the user, or may be determined based on a learning object period (for example, 10 days, or the like). When it is determined that the above-described processing has not exceeded the designated number of steps (in case of No), the operation model generation apparatus 300 returns the processing to step S1904 and continues the flow. The operation model generation apparatus 300 executes the acquisition processing of the state corresponding to the decision of the action by the designated number of steps.

When it is determined in step S1912 that the above-mentioned processing has exceeded the designated number of steps (in the case of Yes), the operation model generation apparatus 300 advances the processing to step S1914. In step S1914, the operation model generation apparatus 300 updates the operation model. For example, the operation model generation unit 316 adds new sample data, which has not been saved so far, to the operation model, in addition to overwriting the value of the weight column in the operation model shown in FIG. 16.

In step S1916, the operation model generation apparatus 300 determines whether the update processing of the operation model has exceeded a designated number of repetition times. Note that, the number of such repetition times may be designated in advance by the user, or may be determined corresponding to the validity of the operation model. When it is determined that the above-described processing does not exceed the designated number of repetition times (in case of No), the operation model generation apparatus 300 returns the processing to step S1902 and continues the flow.

When it is determined in step S1916 that the above-mentioned processing has exceeded the designated number of repetition times (Yes), the operation model generation apparatus 300 ends the flow. For example, in this way, the operation model generation apparatus 300 can generate the operation model configured to output an action corresponding to a state in the piece of equipment 10 by reinforcement learning in which an output of the evaluation model is set as at least a part of a reward.

Figure 20:
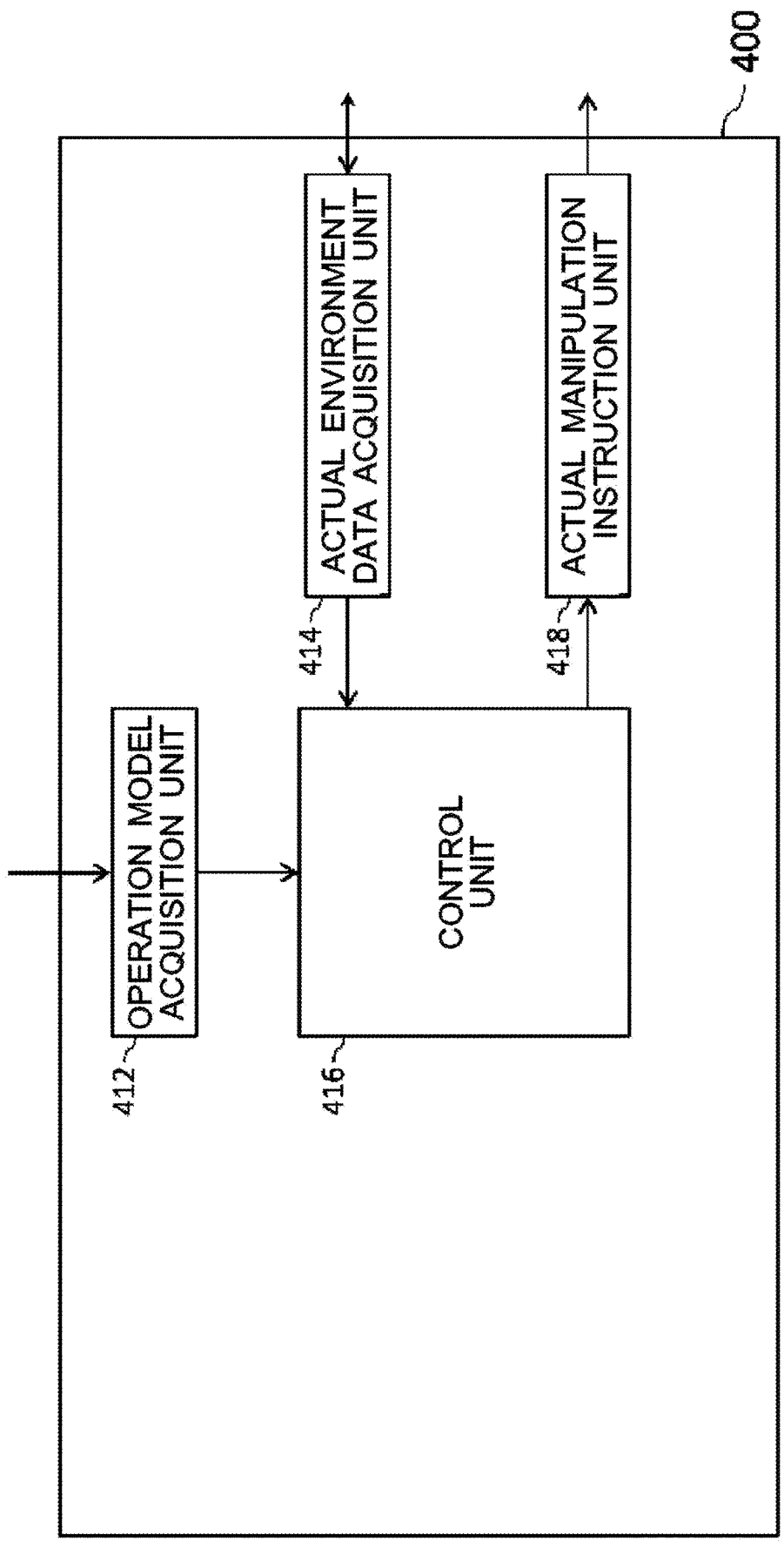
FIG. 20 shows an example of a block diagram of a control apparatus 400 in the operation system 100 according to the present embodiment.

FIG. 20 shows an example of a block diagram of the control apparatus 400 in the operation system 100 according to the present embodiment. The control apparatus 400 may be, for example, a controller in a DCS (Distributed Control System) or a medium scale instrumentation system, an actual-time OS controller, or the like.

The control apparatus 400 includes an operation model acquisition unit 412, an actual environment data acquisition unit 414, a control unit 416, and an actual manipulation instruction unit 418.

The operation model acquisition unit 412 is configured to acquire the operation model output by the operation model output unit 322, via a network, for example. However, it is not limited thereto. The operation model acquisition unit 412 may also be configured to acquire the operation model via various memory devices, or via a user input. The operation model acquisition unit 412 is configured to supply the acquired operation model to the control unit 416.

The actual environment data acquisition unit 414 is configured to acquire actual environmental data representing a state in an actual environment, i.e., the piece of equipment 10. Such actual environment data may be data similar to the state data described above. The actual environment data acquisition unit 414 is configured to supply the acquired actual environment data to the control unit 416.

The control unit 416 is configured to decide a manipulated variable based on the action that is output by the operation model, which is acquired by the operation model acquisition unit 412 according to the state in the actual environment, i.e., the piece of equipment 10 acquired by the actual environment data acquisition unit 414. The control unit 416 is configured to supply the decided manipulated variable to the actual manipulation instruction unit 418.

The actual manipulation instruction unit 418 is configured to apply the manipulated variable decided by the control unit 416 to the controlled object in the actual environment, i.e., the piece of equipment 10.

Figure 21:
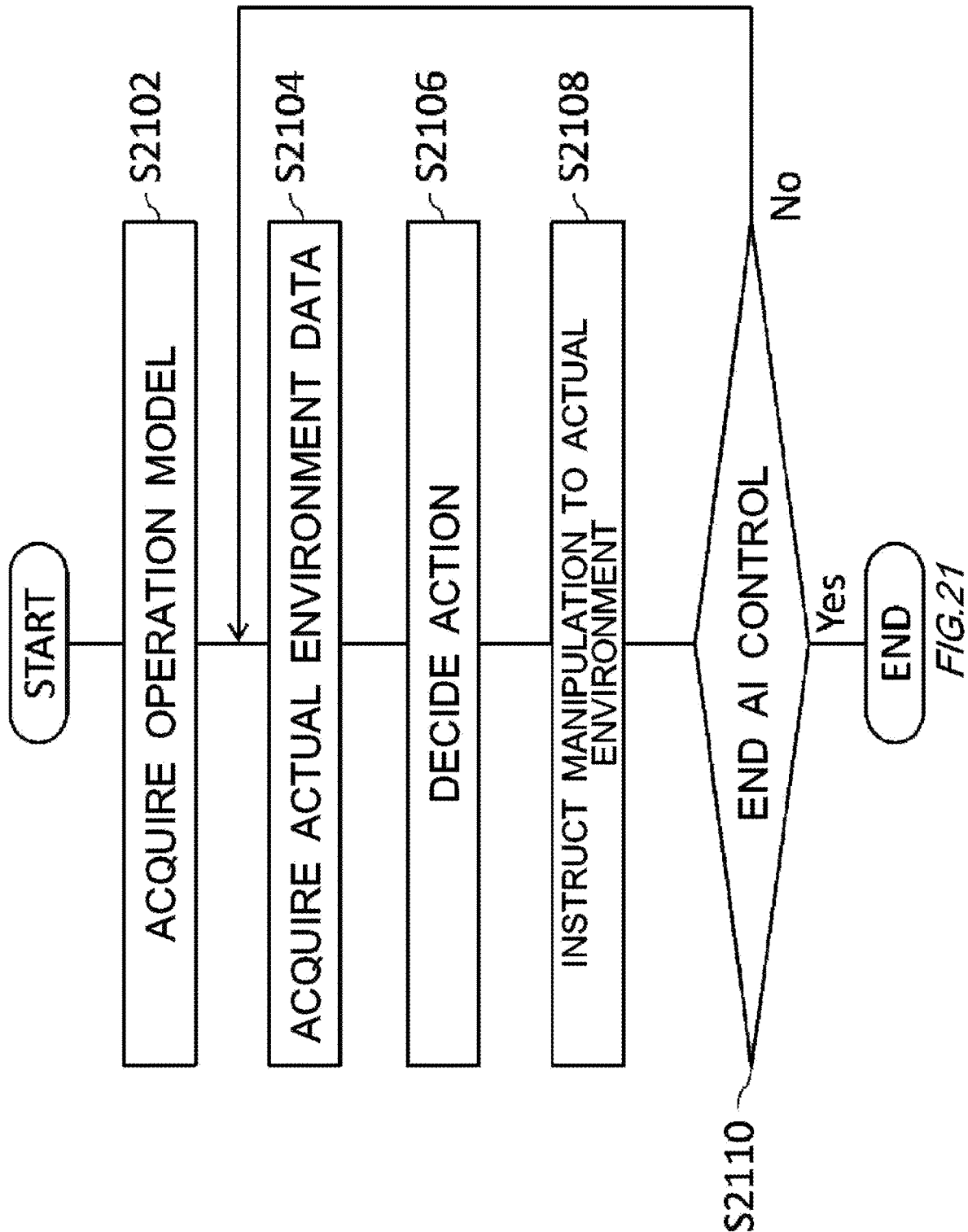
FIG. 21 shows an example of a processing flow in the control apparatus 400.

FIG. 21 shows an example of a processing flow in the control apparatus 400. The control apparatus 400 may execute control processing of the controlled object according to the flow shown in this drawing, for example.

In step S2102, the control apparatus 400 acquires an operation model. For example, the operation model acquisition unit 412 acquires the operation model output in step S1808 of FIG. 18, via a network. The operation model acquisition unit 412 supplies the acquired operation model to the control unit 416.

In step S2104, the control apparatus 400 acquires actual environment data. For example, the actual environment data acquisition unit 414 acquires actual environment data representing a state in the actual environment. Such actual environment data may be data similar to the state data representing the state in the piece of equipment 10 described above. The actual environment data acquisition unit 414 supplies the acquired actual environment data to the control unit 416.

In step S2106, the control apparatus 400 decides an action. For example, the control unit 416 decides an action by selecting the action judged to have the highest reward expectation value by using the operation model. The control unit 416 supplies the decided action to the actual manipulation instruction unit 418.

In step S2108, the control apparatus 400 instructs a manipulation to the actual environment. For example, the actual manipulation instruction unit 418 applies, to the controlled object in the piece of equipment 10, a manipulated variable obtained by adding the action decided in step S2106 to a value of the controlled object in the piece of equipment 10. This varies a state of the actual environment.

In step S2110, the control apparatus 400 determines whether to end AI control. When it is determined to end AI control (in case of Yes), the control apparatus 400 ends the flow. When it is determined not to end AI control (in case of No), the control apparatus 400 returns the processing to step S2104 and continues the flow.

Conventionally, as described in Patent Document 1, for example, known is an AI control technology for controlling a controlled object by using a reinforcement-learned model. However, in the AI control technology, it is necessary for the user to set a reward function for calculating a reward value in advance according to an experience, a sense, or the like. In the case of human intervention in this way, in order to lead an operation cycle to a solution, a lot of effort and time, such as yearly long-term work using multiple labor, are required. In addition, it was necessary to consider the possibility of delay or interruption due to lack of labor or misalignment of personnel, and the possibility of being accompanied by work in remote or dangerous areas. Furthermore, it cannot be said that even if the experience and sense of a skilled operator are used, it is always possible to make a quick and optimal judgment. In the case of long-term plant management, it is not also easy to secure a successor who will succeed to the same level of skill. Further, individual's skills are often one-sided, and there is a limit to sharing information between different departments and functions, and to exhaustively perceiving and solving a plurality of problems.

On the other hand, in the operation system 100 according to the present embodiment, AI automatically finds a bottleneck (potential fault) in operation, and generates an indicator for improvement, as an evaluation model. AI performs trial and error based on the applied indicator, and generates an operation model that instructs a better operation method. The AI controller AI-controls the controlled object by using the operation model. Thereby, according to the operation system 100 of the present embodiment, an environment in which the piece of equipment 10 can be autonomously controlled using an AI technology is provided. The operation system 100 according to the present embodiment is configured to update the evaluation model and the operation model, based on the state in the piece of equipment under such AI control, and to AI-control the controlled object by using the updated operation model. Thereby, according to the operation system 100 of the present embodiment, a loop for improving an operation in the piece of equipment 10 can be turned autonomously. Therefore, according to the operation system 100 of the present embodiment, the PDCA cycle of data collection and investigation that has been performed so far is performed continuously at high-speed without a break for 24 hours, 365 days, so that productivity and efficiency of plants and the like can be continued semi-permanently and improved. In addition, since decision-making can be made objectively and comprehensively, in response to situations, the knowledge accumulated over a long period of time can be utilized in various ways, regardless of the risk of skill succession due to retirement of a skilled operator.

Various embodiments of the present invention may also be described with reference to flowcharts and block diagrams, where the blocks may represent (1) a stage of processing in which an operation is performed or (2) a section of a device that is responsible for performing the operation. Certain stages and sections may be implemented by dedicated circuitry, programmable circuitry provided with computer readable instructions stored on a computer readable medium, and/or a processor provided with computer readable instructions stored on a computer readable medium. The dedicated circuitry may include digital and/or analog hardware circuits, and may include integrated circuits (ICs) and/or discrete circuits. The programmable circuitry may include reconfigurable hardware circuits including memory elements such as logic AND, logic OR, logic XOR, logic NAND, logic NOR, and other logic operations, flip-flops, registers, field programmable gate arrays (FPGA), programmable logic arrays (PLA), and the like.

The computer readable medium may include any tangible device capable of storing instructions for execution by a suitable device, so that the computer readable medium having the instructions stored therein will have a product including instructions that can be executed to create means for performing the operations designated in flowcharts or block diagrams. Examples of the computer readable medium may include an electronic storage medium, a magnetic storage medium, an optical storage medium, an electromagnetic storage medium, a semiconductor storage medium, and the like. More detailed examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of the processor include a computer processor, a processing unit, a microprocessor, a digital signal processor, a controller, a microcontroller, and the like.

Figure 22:
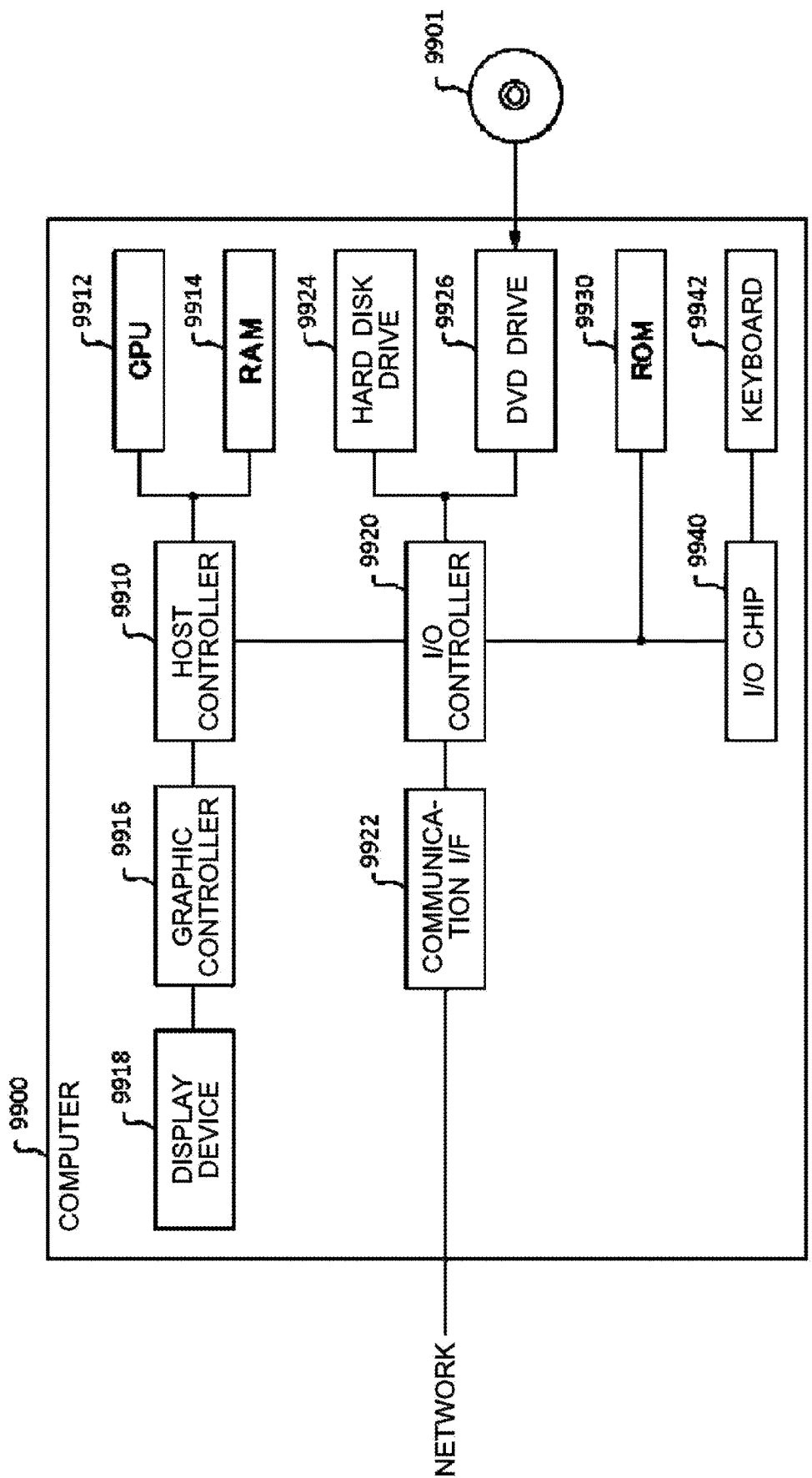
FIG. 22 shows an example of a computer 9900 in which a plurality of aspects of the present invention may be embodied in whole or in part.

FIG. 22 illustrates an example of a computer 9900 in which a plurality of aspects of the present invention may be embodied in whole or in part. A program that is installed in the computer 9900 can cause the computer 9900 to function as or execute operations associated with the apparatus of the embodiment of the present invention or one or more sections of the apparatus, and/or cause the computer 9900 to execute the processes of the embodiment of the present invention or steps thereof. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphic controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphic controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads programs and data from the IC card, and/or writes programs and data to the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable storage medium such as the DVD-ROM 9901 or the IC card. The program is read from the computer readable storage medium, installed into the hard disk drive 9924, RAM 9914, ROM 9930, which are also examples of a computer readable storage medium, and executed by CPU 9912. The information processing described in these programs is read into the computer 9900, resulting in cooperation between a program and the above-mentioned various types of hardware resources. An apparatus or method may be constituted by actualizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

Also, the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. Also the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable storage medium on or near the computer 9900. Also a recording medium such as a hard disk or a RAM provided in a server system connected to a dedicated communication network or the Internet can be used as the computer readable storage medium, thereby providing the program to the computer 9900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: equipment
20 headquarters
100: operation system
200 evaluation model generation apparatus
210: labeling function unit
212: operation target acquisition unit
214: state data acquisition unit
216: correlation data generation unit
218: training label acquisition unit
220: labeling unit
222: labeling data output unit
224: labeling model update unit
230: machine learning function unit
240: labeling data acquisition unit
250: evaluation model generation unit
252: learning unit
254: preprocessing unit
256: machine learning unit
260: evaluation model determination unit
270: evaluation model output unit
300: operation model generation apparatus
312: evaluation model acquisition unit
314: learning environment data acquisition unit
316: operation model generation unit
318: learning manipulation instruction unit
320: operation model determination unit
322: operation model output unit
400: control apparatus
412: operation model acquisition unit
414: actual environment data acquisition unit
416: control unit
418 actual manipulation instruction unit
9900: computer
9901: DVD-ROM
9910: host controller
9912: CPU
9914: RAM
9916: graphic controller
9918: display device
9920: input/output controller
9922: communication interface
9924: hard disk drive
9926: DVD drive
9930: ROM
9940: input/output chip
9942: keyboard

What is claimed is:

1. An operation system comprising:
an evaluation model generation apparatus configured to generate, by machine learning, an evaluation model configured to output an indicator indicating a result of evaluating a state in a piece of equipment with respect to an intended target based on an operation target in the piece of equipment and the state in the piece of equipment;
an operation model generation apparatus configured to generate an operation model configured to output an action corresponding to the state in the piece of equipment, by reinforcement learning in which an output of the evaluation model is set as at least a part of a reward; and
a control apparatus configured to apply, to a controlled object in the piece of equipment, a manipulated variable based on the action that is output by the operation model according to the state in the piece of equipment; wherein
the evaluation model generation apparatus includes a correlation data generation unit to generate correlation data representing at least any of a correlation between at least one physical quantity included in acquired state data from the piece of equipment and a time or a correlation between at least two physical quantities included in the acquired state data from the piece of equipment.

2. The operation system according to claim 1, wherein the evaluation model generation apparatus is configured to update the evaluation model, based on the state in the piece of equipment when the controlled object is controlled using the operation model.

3. The operation system according to claim 2, wherein the operation model generation apparatus is configured to update the operation model by reinforcement learning in which an output of the evaluation model updated by the evaluation model generation apparatus is set as at least a part of a reward.

4. The operation system according to claim 3, wherein the control apparatus is configured to control the controlled object by using the operation model updated by the operation model generation apparatus.

5. The operation system according to claim 4, wherein the evaluation model generation apparatus includes:

an operation target acquisition unit configured to acquire the operation target, a state data acquisition unit configured to acquire state data representing the state in the piece of equipment, a labeling unit configured to label the correlation data by using a labeling model, and an evaluation model generation unit configured to generate the evaluation model by using the correlation data labeled by the labeling unit.

6. The operation system according to claim 5, wherein the evaluation model generation apparatus further includes an evaluation model determination unit configured to determine validity of the evaluation model.

7. The operation system according to claim 2, wherein the evaluation model generation apparatus includes:

an operation target acquisition unit configured to acquire the operation target, a state data acquisition unit configured to acquire state data representing the state in the piece of equipment, a labeling unit configured to label the correlation data by using a labeling model, and an evaluation model generation unit configured to generate the evaluation model by using the correlation data labeled by the labeling unit.

8. The operation system according to claim 7, wherein the evaluation model generation apparatus further includes an evaluation model determination unit configured to determine validity of the evaluation model.

9. The operation system according to claim 3, wherein the evaluation model generation apparatus includes:

an operation target acquisition unit configured to acquire the operation target, a state data acquisition unit configured to acquire state data representing the state in the piece of equipment, a labeling unit configured to label the correlation data by using a labeling model, and an evaluation model generation unit configured to generate the evaluation model by using the correlation data labeled by the labeling unit.

10. The operation system according to claim 9, wherein the evaluation model generation apparatus further includes an evaluation model determination unit configured to determine validity of the evaluation model.

11. The operation system according to claim 1, wherein the evaluation model generation apparatus includes:

an operation target acquisition unit configured to acquire the operation target, a state data acquisition unit configured to acquire state data representing the state in the piece of equipment, a labeling unit configured to label the correlation data by using a labeling model, and an evaluation model generation unit configured to generate the evaluation model by using the correlation data labeled by the labeling unit.

12. The operation system according to claim 11, wherein the evaluation model generation apparatus further includes an evaluation model determination unit configured to determine validity of the evaluation model.

13. The operation system according to claim 12, wherein the evaluation model generation apparatus further includes an evaluation model output unit configured to output the evaluation model when the evaluation model is determined valid.

14. The operation system according to claim 13, wherein the evaluation model generation apparatus further includes a labeling model update unit configured to update the labeling model when the evaluation model is determined valid.

15. The operation system according to claim 12, wherein the evaluation model generation apparatus further includes a labeling model update unit configured to update the labeling model when the evaluation model is determined valid.

16. The operation system according to claim 15, wherein the evaluation model generation apparatus further includes a training label acquisition unit configured to acquire a training label for at least a part of the correlation data, and the labeling model update unit is configured to generate a labeling model for update, separately from an initial labeling model generated based on the training label.

17. An operation method comprising:

generating, by machine learning, an evaluation model configured to output an indicator indicating a result of evaluating a state in a piece of equipment with respect to an intended target based on an operation target in the piece of equipment and a state in the piece of equipment;

generating an operation model configured to output an action corresponding to the state in the piece of equipment, by reinforcement learning in which an output of the evaluation model is set as at least a part of a reward;

applying, to a controlled object in the piece of equipment, a manipulated variable based on the action that is output by the operation model according to the state in the piece of equipment; and generating, based on the operation target, correlation data representing at least any of a correlation between at least one physical quantity included in the state data and a time or a correlation between at least two physical quantities included in the state data.

18. The operation method according to claim 17, wherein the generating the evaluation model includes:

acquiring the operation target, acquiring state data representing the state in the piece of equipment, generating, based on the operation target, correlation data representing at least any of a correlation between at least one physical quantity included in the state data and a time or a correlation between at least two physical quantities included in the state data, labeling the correlation data by using a labeling model, and generating the evaluation model by using the correlation data labeled in the labeling.

19. A non-transitory recording medium having recorded thereon an operation program that, when executed by a computer, causes the computer to function as:

an evaluation model generation apparatus configured to generate, by machine learning, an evaluation model configured to output an indicator indicating a result of evaluating a state in a piece of equipment with respect to an intended target based on an operation target in the piece of equipment and a state in the piece of equipment;

an operation model generation apparatus configured to generate an operation model configured to output an action corresponding to the state in the piece of equipment, by reinforcement learning in which an output of the evaluation model is set as at least a part of a reward; and a control apparatus configured to apply, to a controlled object in the piece of equipment, a manipulated variable based on the action that is output by the operation model according to the state in the piece of equipment; wherein the evaluation model generation apparatus includes
a correlation data generation unit configured to generate correlation data representing at least any of a correlation between at least one physical quantity included in acquired state data from the piece of equipment and a time or a correlation between at least two physical quantities included in the acquired state data from the piece of equipment.

20. The non-transitory recording medium having recorded thereon an operation program according to claim 19, wherein
the causing the computer to function as the evaluation model generation apparatus includes causing the computer to function as:
an operation target acquisition unit configured to acquire the operation target, a state data acquisition unit configured to acquire state data representing the state in the piece of equipment,
a labeling unit configured to label the correlation data by using a labeling model, and
an evaluation model generation unit configured to generate the evaluation model by using the correlation data labeled by the labeling unit.

\* \* \* \* \*